United States Patent
Fang et al.

(10) Patent No.: US 12,289,492 B2
(45) Date of Patent: Apr. 29, 2025

(54) ENCODING AND DECODING METHOD, APPARATUS, AND SYSTEM

(71) Applicant: HUAWEI TECHNOLOGIES CO., LTD., Guangdong (CN)

(72) Inventors: Huameng Fang, Shenzhen (CN); Xin Liu, Guangdong (CN); Peiyun Di, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 148 days.

(21) Appl. No.: 18/173,887

(22) Filed: Feb. 24, 2023

(65) Prior Publication Data
US 2023/0209131 A1 Jun. 29, 2023

Related U.S. Application Data

(63) Continuation of application No. PCT/CN2021/111545, filed on Aug. 9, 2021.

(30) Foreign Application Priority Data

Aug. 25, 2020 (CN) .......................... 202010865789.2

(51) Int. Cl.
*H04N 19/597* (2014.01)
*H04N 21/218* (2011.01)
*H04N 21/4402* (2011.01)

(52) U.S. Cl.
CPC ....... *H04N 21/4402* (2013.01); *H04N 19/597* (2014.11); *H04N 21/21805* (2013.01)

(58) Field of Classification Search
CPC ............. H04N 21/4402; H04N 19/597; H04N 21/21805; H04N 19/107; H04N 19/172;
(Continued)

(56) References Cited

U.S. PATENT DOCUMENTS 8,149,876 B2 * 4/2012 Liebchen .............. G10L 19/022
370/477
8,270,482 B2 * 9/2012 Kim ...................... H04N 19/00
382/233
(Continued)

FOREIGN PATENT DOCUMENTS

CN 101588488 A 11/2009
CN 101686391 A 3/2010
(Continued)

OTHER PUBLICATIONS

International Search Report and Written Opinion issued in PCT/CN2021/111545, dated Nov. 2, 2021, 9 pages.
(Continued)

*Primary Examiner* — Helen Shibru

(57) ABSTRACT

An encoding and decoding method are disclosed. The method includes: Each of multiple viewpoint bitstreams includes a first type bitstream and a second type bitstream; when a first image frame in a first type bitstream of a first viewpoint bitstream is played, receiving a switching request that indicates to play a second viewpoint bitstream; determining a first random access frame that is in a first type bitstream and/or a second type bitstream of the second viewpoint bitstream and has a play moment after and closest to the first image frame; decoding to obtain the first random access frame based on encoded data of the first random access frame in the second viewpoint bitstream, and decoding to obtain and play an image frame that is in the first type bitstream of the second viewpoint bitstream by using the first random access frame as a reference frame.

19 Claims, 15 Drawing Sheets

(58) Field of Classification Search
CPC ..... H04N 21/234381; H04N 21/23439; H04N 21/8455; H04N 21/2343; H04N 21/658
USPC ........................................................ 386/353
See application file for complete search history.

(56) References Cited

U.S. PATENT DOCUMENTS

| | | | | |
|---|---|---|---|---|
| 8,854,486 | B2* | 10/2014 | Tian ....................... | H04N 19/70 348/47 |
| 9,661,320 | B2* | 5/2017 | Sasaki .................. | H04N 19/597 |
| 9,860,540 | B2* | 1/2018 | Wang ................... | H04N 19/186 |
| 2007/0121722 | A1* | 5/2007 | Martinian ............ | H04N 19/597 375/E7.031 |
| 2018/0241988 | A1* | 8/2018 | Zhou .................. | H04N 21/6125 |

FOREIGN PATENT DOCUMENTS

| | | |
|---|---|---|
| CN | 102055967 A | 5/2011 |
| CN | 110351606 A | 10/2019 |
| CN | 110999294 A | 4/2020 |

OTHER PUBLICATIONS

Extended European Search Report issued in EP21860120.1, dated Dec. 6, 2023, 7 pages.

* cited by examiner

ENCODING AND DECODING METHOD, APPARATUS, AND SYSTEM

CROSS-REFERENCE TO RELATED APPLICATIONS

This application continuation of International Application No. PCT/CN2021/111545, filed on Aug. 9, 2021, which claims priority to Chinese Patent Application No. 202010865789.2, filed on Aug. 25, 2020. The disclosures of the aforementioned applications are hereby incorporated by reference in their entireties.

TECHNICAL FIELD

Embodiments of the present disclosure relate to the image processing field, and in particular, to an encoding and decoding method, an apparatus, and a system.

BACKGROUND

In an on-demand or live broadcast application such as a sports event or live streaming, to provide a user with multi-angle and three-dimensional stereoscopic visual experience, multiple video cameras (a video camera is referred to as a viewpoint) may be disposed at different positions of a same scene to shoot the scene from different angles, to obtain multiple video signals of the scene. The user may choose to watch a scene video shot at a specific angle, and switch to a scene video shot at another angle during watching. Therefore, to enable the user to perceive video images from different angles without frame freezing, a minimum switching and decoding delay between videos from the multiple angles needs to be ensured.

A most commonly used bitstream coding scheme is to encode the videos captured by all the viewpoints at a same fixed interval of intra prediction frames (prediction modes of all blocks during decoding are an intra-frame reference mode). A first frame of video decoding requires that the prediction modes of all the blocks are the intra-frame reference mode. When the bitstreams captured by the multiple viewpoints are encoded by using a fixed intra prediction frame, for switching between video images of different angles, switching to a new viewpoint can be performed only when video decoding of a current viewpoint proceeds to an access point (intra prediction frame) of a next viewpoint bitstream.

It is assumed that an interval of intra prediction frames is X when the bitstreams of the multiple viewpoints are encoded. In a worst case, there is a decoding delay of approximately X−1 frames. When switching between video images from different angles, the user may experience a switching delay of X−1 frames. If a frame rate is 30 frames per second (FPS) and there is a bitstream access point (intra prediction frame) every eight frames, in a worst case, there is a delay of seven frames, that is, the delay may reach 233 milliseconds (ms). The user may perceive obvious slow response of the system, bringing poor user experience.

SUMMARY

Embodiments of the present disclosure provide an encoding and decoding method, an apparatus, and a system, to implement viewpoint switching with a low switching delay in a multi-viewpoint shooting scenario, and improve user experience.

To achieve the foregoing objective, the following technical solutions are used in embodiments of the present disclosure.

According to a first aspect, a decoding method is provided, where the method may be applied to a decoding device. The decoding device is configured to decode multiple viewpoint bitstreams obtained by shooting a same scene at multiple viewpoints, and each of the multiple viewpoint bitstreams includes a first type bitstream and a second type bitstream. A first type bitstream of any viewpoint bitstream in the multiple viewpoint bitstreams and/or a second type bitstream of the viewpoint bitstream include/includes a random access frame serving as a reference frame for decoding the first type bitstream of the viewpoint bitstream. The decoding method may include: receiving a switching request when a first image frame in a first type bitstream of a first viewpoint bitstream in the multiple viewpoint bitstreams is played, where the switching request indicates the decoding device to play a second viewpoint bitstream in the multiple viewpoint bitstreams: determining a first random access frame that is in a first type bitstream and/or a second type bitstream of the second viewpoint bitstream and whose play moment is after the first image frame and closest to the first image frame, where the first type bitstream of the second viewpoint bitstream includes a random access frame whose play moment is between play moments of two adjacent random access frames of the first type bitstream of the first viewpoint bitstream, and/or the second type bitstream of the second viewpoint bitstream includes a random access frame whose play moment is between the play moments of the two adjacent random access frames of the first type bitstream of the first viewpoint bitstream, and a play moment of the first image frame is between the play moments of the two adjacent random access frames; and decoding to obtain the first random access frame based on encoded data of the first random access frame in the second viewpoint bitstream, and decoding to obtain and play an image frame that is in the first type bitstream of the second viewpoint bitstream and whose play moment is after the first random access frame by using the first random access frame as a reference frame.

According to the decoding method provided in the present disclosure, the first type bitstream of the second viewpoint bitstream is configured to include a random access frame whose play moment is between play moments of two adjacent random access frames of the first type bitstream of the first viewpoint bitstream, and/or the second type bitstream of the second viewpoint bitstream is configured to include a random access frame whose play moment is between the play moments of the two adjacent random access frames of the first type bitstream of the first viewpoint bitstream. When the first viewpoint bitstream is switched to the second viewpoint bitstream, the switching can be performed before playing of a random access segment of the first viewpoint bitstream is completed. This reduces an interval between a switching point expected by the user and a random access frame (access point) of a target viewpoint, reduces a switching delay, implements viewpoint switching with a low switching delay in a multi-viewpoint shooting scenario, and improves user experience.

Two adjacent random access frames mean that there is no random access frame between the two adjacent random access frames, but there may be a non-random access frame.

In a possible implementation, play moments corresponding to random access frames in the first type bitstream of the first viewpoint bitstream are all different from play moments corresponding to random access frames in the first type bitstream of the second viewpoint bitstream: or play moments corresponding to random access frames in the first type bitstream of the first viewpoint bitstream are all different from play moments corresponding to random access frames in the second type bitstream of the second viewpoint bitstream. Play moments corresponding to random access frames of first type bitstreams of different viewpoint bitstreams are configured to be different, or play moments corresponding to random access frames of first type bitstreams and second type bitstreams of different viewpoint bitstreams are different, to reduce an interval between a switching point expected by the user and a random access frame (access point) of a target viewpoint, reduce a switching delay, implement viewpoint switching with a low switching delay in a multi-viewpoint shooting scenario, and improve user experience.

In another possible implementation, play moments corresponding to random access frames in the first type bitstream of the second viewpoint bitstream are all different from play moments corresponding to random access frames in the second type bitstream of the second viewpoint bitstream. The play moments corresponding to the random access frames in the first type bitstream are different from the play moments corresponding to the random access frames in the second type bitstream of the second viewpoint bitstream, to ensure that when another viewpoint bitstream is switched to the second viewpoint bitstream, an interval between the first random access frame and a switching point expected by the user is minimized, and a switching delay is reduced as much as possible.

In another possible implementation, the play moment corresponding to the first random access frame is before a play moment corresponding to a second random access frame, and the second random access frame is a random access frame that is in the first type bitstream of the first viewpoint bitstream and that is after the first image frame and closest to the first image frame. In this implementation, the first random access frame is located in the second type bitstream of the second viewpoint bitstream, and access points of the first type bitstream are connected by using the second type bitstream, further reducing a switching delay.

In another possible implementation, the second type bitstream of any viewpoint bitstream includes any random access frame, the random access frame is an intra prediction frame, and an inter prediction of an inter prediction coding frame that is in the first type bitstream of the viewpoint bitstream and whose play moment is after the play moment of the random access frame refers only to at least one of the random access frame, an image frame that is in the first type bitstream of the viewpoint bitstream and whose play moment is at the play moment of the random access frame, or an image frame that is in the first type bitstream of the viewpoint bitstream and whose play moment is after the play moment of the random access frame. In this implementation, a specific decoding process in which access points of the first type bitstream are connected by using the second type bitstream is provided, better ensuring a reduced switching delay.

In another possible implementation, the second type bitstream of any viewpoint bitstream includes any random access frame, the random access frame is an intra prediction frame, and an inter prediction of an inter prediction coding frame that is in the first type bitstream of the viewpoint bitstream and whose play moment is after the play moment of the random access frame does not refer to an image frame that is in the second type bitstream of the viewpoint bitstream and whose play moment is after the play moment of the random access frame.

In another possible implementation, the second type bitstream of any viewpoint bitstream includes any random access frame, the random access frame is an intra prediction frame, and an inter prediction of an inter prediction coding frame that is in the first type bitstream of the viewpoint bitstream and whose play moment is after the play moment of the random access frame does not refer to an image frame that is in the first type bitstream of the any viewpoint bitstream and whose play moment is before the play moment of the random access frame.

In another possible implementation, the viewpoint bitstream is the second viewpoint bitstream, and the random access frame is the first random access frame.

In another possible implementation, the multiple viewpoints are at least two viewpoints, the multiple viewpoint bitstreams are at least two viewpoint bitstreams, and a quantity of the multiple viewpoints is the same as that of the multiple viewpoint bitstreams.

In another possible implementation, the random access frame of the second type bitstream of the viewpoint bitstream is used to: when an image frame serving as a reference frame in the first type bitstream of the viewpoint bitstream is unavailable, replace the unavailable reference frame in the first type bitstream of the viewpoint bitstream; and serve as a reference frame of an image frame that refers to the unavailable reference frame in the first type bitstream of the viewpoint bitstream.

In another possible implementation, the first type bitstream and the second type bitstream of the second viewpoint bitstream are obtained by encoding a same video frame sequence. The second type bitstream is obtained by encoding a subsequence of the same video frame sequence, adjacent image frames in the subsequence are at an interval of M frames in the same video sequence, and M is greater than or equal to 1. By encoding at an interval of M frames, an amount of encoding calculation, storage and bandwidth requirements are reduced.

In another possible implementation, $i^{th}$ random access frames in first type bitstreams of two adjacent viewpoint bitstreams in a preset viewpoint order are at an interval of N frames, where i is greater than or equal to 1, and is less than or equal to a total quantity of random access frames in the viewpoint bitstream, and N is greater than or equal to 1. A specific implementation in which play moments corresponding to random access frames in first type bitstreams of adjacent viewpoint bitstreams are different is provided.

In another possible implementation, determining the first random access frame that is in the first type bitstream and/or the second type bitstream of the second viewpoint bitstream and whose play moment is after the first image frame and closest to the first image frame includes: determining, between a next random access frame that is in the first type bitstream of the second viewpoint bitstream and whose play moment is after the first image frame and a next random access frame that is in the second type bitstream of the second viewpoint bitstream and whose play moment is after the first image frame, a random access frame whose play moment is closest to the first image frame as the first random access frame, to ensure a minimum switching delay.

In another possible implementation, the first type bitstream includes intra prediction frames distributed at intervals, two adjacent intra prediction frames are at an interval of an inter prediction frame, and image frames in the second type bitstream are all intra prediction frames.

In another possible implementation, a type of the image frame in the second type bitstream may be an I-frame, a P-frame, or a B-frame whose coding block prediction modes are all intra-frame prediction.

In another possible implementation, one viewpoint bitstream may include multiple bitstream groups. One bitstream group includes a first type bitstream and a second type bitstream, and parameters of first type bitstreams in different bitstream groups are different, where the parameter may be resolution or a bit rate. Switching between different viewpoint bitstreams may be switching between bitstreams with a same parameter, or may be switching between bitstreams with different parameters. The bit rate of the first type bitstream may be the same as or may be different from that of the second type bitstream in a bitstream group.

According to a second aspect, an encoding method is provided. The method may be applied to an encoding device, and the encoding device is configured to encode multiple video frame sequences obtained by shooting a same scene at multiple viewpoints. The encoding method may include: obtaining multiple video frame sequences obtained by shooting a same scene at multiple viewpoints; and encoding the multiple video frame sequences to obtain multiple viewpoint bitstreams, where a quantity of the multiple video sequences is the same as that of the multiple viewpoint bitstreams, where each of the multiple viewpoint bitstreams includes a first type bitstream and a second type bitstream: a first type bitstream of any viewpoint bitstream in the multiple viewpoint bitstreams and/or a second type bitstream of the viewpoint bitstream include/includes a random access frame serving as a reference frame for decoding the first type bitstream of the viewpoint bitstream: the first type bitstream of the viewpoint bitstream includes a random access frame whose play moment is between play moments of two adjacent random access frames of the first type bitstream of another viewpoint bitstream in the multiple viewpoint bitstreams, and/or the second type bitstream of the viewpoint bitstream includes a random access frame whose play moment is between the play moments of the two adjacent random access frames of the first type bitstream of the another viewpoint bitstream.

According to the encoding method provided in the present disclosure, a first type bitstream of any viewpoint bitstream is configured to include a random access frame whose play moment is between play moments of two adjacent random access frames of a first type bitstream of another viewpoint bitstream, and/or a second type bitstream of the viewpoint bitstream is configured to include a random access frame whose play moment is between the play moments of the two adjacent random access frames of the first type bitstream of the another viewpoint bitstream. When the another viewpoint bitstream is switched to the viewpoint bitstream, the switching can be performed before playing of a random access segment of the another viewpoint bitstream is completed. This reduces an interval between a switching point expected by the user and a random access frame (access point) of a target viewpoint, reduces a switching delay, implements viewpoint switching with a low switching delay in a multi-viewpoint shooting scenario, and improves user experience.

In a possible implementation, play moments corresponding to random access frames in a first type bitstream of any viewpoint bitstream are all different from play moments corresponding to random access frames in a first type bitstream of another viewpoint bitstream: or play moments corresponding to random access frames in a first type bitstream of any viewpoint bitstream are all different from play moments corresponding to random access frames in a second type bitstream of another viewpoint bitstream. It is configured that play moments corresponding to random access frames of first type bitstreams of different viewpoint bitstreams are different, or play moments corresponding to random access frames of first type bitstreams and second type bitstreams of different viewpoint bitstreams are different, to reduce an interval between a switching point expected by the user and a random access frame (access point) of a target viewpoint, reduce a switching delay, implement viewpoint switching with a low switching delay in a multi-viewpoint shooting scenario, and improve user experience.

In another possible implementation, play moments corresponding to random access frames in a first type bitstream of any viewpoint bitstream are all different from play moments corresponding to random access frames in a second type bitstream of the viewpoint bitstream. Play moments corresponding to random access frames in the first type bitstream are different from play moments corresponding to random access frames in the second type bitstream of a viewpoint bitstream, to ensure that when another viewpoint bitstream is switched to the viewpoint bitstream, an interval between the first random access frame and a switching point expected by the user is minimized, and a switching delay is reduced as much as possible.

In another possible implementation, play moments corresponding to random access frames in a first type bitstream of any viewpoint bitstream are all different from play moments corresponding to random access frames in a second type bitstream of the viewpoint bitstream. Play moments corresponding to random access frames in the first type bitstream are different from play moments corresponding to random access frames in the second type bitstream of any viewpoint bitstream, to ensure that when another viewpoint bitstream is switched to the viewpoint bitstream, an interval between an actual switching point and a switching point expected by the user is minimized, and a switching delay is reduced as much as possible.

In another possible implementation, the second type bitstream of any viewpoint bitstream includes any random access frame, the random access frame is an intra prediction frame, and an inter prediction of an inter prediction coding frame that is in the first type bitstream of the viewpoint bitstream and whose play moment is after the play moment of the random access frame refers only to at least one of the random access frame, an image frame that is in the first type bitstream of the viewpoint bitstream and whose play moment is at the play moment of the random access frame, or an image frame that is in the first type bitstream of the viewpoint bitstream and whose play moment is after the play moment of the random access frame. In this implementation, a specific decoding process in which access points of the first type bitstream are connected by using the second type bitstream is provided, better ensuring a reduced switching delay.

In another possible implementation, the second type bitstream of any viewpoint bitstream includes any random access frame, the random access frame is an intra prediction frame, and an inter prediction of an inter prediction coding frame that is in the first type bitstream of the viewpoint bitstream and whose play moment is after the play moment of the random access frame does not refer to an image frame that is in the second type bitstream of the viewpoint bitstream and whose play moment is after the play moment of the random access frame.

In another possible implementation, the second type bitstream of any viewpoint bitstream includes any random access frame, the random access frame is an intra prediction frame, and an inter prediction of an inter prediction coding frame that is in the first type bitstream of the viewpoint bitstream and whose play moment is after the play moment of the random access frame does not refer to an image frame that is in the first type bitstream of the viewpoint bitstream and whose play moment is before the play moment of the random access frame.

In another possible implementation, the multiple viewpoints are at least two viewpoints, the multiple viewpoint bitstreams are at least two viewpoint bitstreams, and a quantity of the multiple viewpoints is the same as that of the multiple viewpoint bitstreams.

In another possible implementation, the first type bitstream and the second type bitstream of any viewpoint bitstream are obtained by encoding a same video frame sequence. The second type bitstream is obtained by encoding a subsequence of the same video frame sequence, adjacent image frames in the subsequence are at an interval of M frames in the same video sequence, and M is greater than or equal to 1. By encoding at an interval of M frames, an amount of encoding calculation, storage and bandwidth requirements are reduced.

In another possible implementation, $i^{th}$ random access frames in first type bitstreams of two adjacent viewpoint bitstreams in a preset viewpoint order are at an interval of N frames, where i is greater than or equal to 1, and is less than or equal to a total quantity of random access frames in the viewpoint bitstream, and N is greater than or equal to 1. A specific implementation in which play moments corresponding to random access frames in first type bitstreams of adjacent viewpoint bitstreams are different is provided.

In another possible implementation, the first type bitstream includes intra prediction frames distributed at intervals, two adjacent intra prediction frames are at an interval of an inter prediction frame, and image frames in the second type bitstream are all intra prediction frames.

In another possible implementation, a type of the image frame in the second type bitstream may be an I-frame, a P-frame, or a B-frame whose coding block prediction modes are all intra-frame prediction.

According to a third aspect, a decoding device is provided. The decoding device is configured to decode multiple viewpoint bitstreams obtained by shooting a same scene at multiple viewpoints, and each of the multiple viewpoint bitstreams includes a first type bitstream and a second type bitstream. A first type bitstream of any viewpoint bitstream in the multiple viewpoint bitstreams and/or a second type bitstream of the viewpoint bitstream include/includes a random access frame serving as a reference frame for decoding the first type bitstream of the viewpoint bitstream. The decoding device may include a receiving unit, a determining unit, and a decoding and playing unit.

The receiving unit is configured to receive a switching request when the decoding device plays a first image frame in a first type bitstream of a first viewpoint bitstream in the multiple viewpoint bitstreams, where the switching request indicates the decoding device to play a second viewpoint bitstream in the multiple viewpoint bitstreams.

The determining unit is configured to determine a first random access frame that is in a first type bitstream and/or a second type bitstream of the second viewpoint bitstream and whose play moment is after the first image frame and closest to the first image frame. The first type bitstream of the second viewpoint bitstream includes a random access frame whose play moment is between play moments of two adjacent random access frames of the first type bitstream of the first viewpoint bitstream, and/or the second type bitstream of the second viewpoint bitstream includes a random access frame whose play moment is between the play moments of the two adjacent random access frames of the first type bitstream of the first viewpoint bitstream, and a play moment of the first image frame is between the play moments of the two adjacent random access frames The decoding and playing unit is configured to decode to obtain the first random access frame based on encoded data of the first random access frame in the second viewpoint bitstream, and decode to obtain and play an image frame that is in the first type bitstream of the second viewpoint bitstream and whose play moment is after the first random access frame by using the first random access frame as a reference frame.

It should be noted that the decoding device provided in the third aspect is configured to implement the decoding method provided in the first aspect. For specific implementation of the decoding device, refer to any one of the first aspect or the possible implementations of the first aspect. Details are not described again.

According to a fourth aspect, an encoding device is provided. The encoding device is configured to encode multiple video frame sequences obtained by shooting a same scene at multiple viewpoints. The encoding device may include an obtaining unit and an encoding unit.

The obtaining unit is configured to obtain multiple video frame sequences obtained by shooting a same scene at multiple viewpoints.

The encoding unit is configured to encode the multiple video frame sequences obtained by the obtaining unit, to obtain multiple viewpoint bitstreams, where a quantity of the multiple video sequences is the same as that of the multiple viewpoint bitstreams. Each of the multiple viewpoint bitstreams includes a first type bitstream and a second type bitstream; and a first type bitstream of any viewpoint bitstream in the multiple viewpoint bitstreams and/or a second type bitstream of the viewpoint bitstream include/includes a random access frame serving as a reference frame for decoding the first type bitstream of the viewpoint bitstream. The first type bitstream of the viewpoint bitstream includes a random access frame whose play moment is between play moments of two adjacent random access frames of the first type bitstream of another viewpoint bitstream in the multiple viewpoint bitstreams, and/or the second type bitstream of the viewpoint bitstream includes a random access frame whose play moment is between the play moments of the two adjacent random access frames in the first type bitstream of the another viewpoint bitstream.

It should be noted that the encoding device provided in the fourth aspect is configured to implement the encoding method provided in the second aspect. For specific implementation of the encoding device, refer to any one of the second aspect or the possible implementations of the second aspect. Details are not described again.

According to a fifth aspect, a decoding device is provided. The decoding device may implement a function in the method example described in the first aspect. The function may be implemented by hardware, or may be implemented by hardware executing corresponding software. The hardware or the software includes one or more modules corresponding to the functions. The decoding device may exist in a product form of a chip.

In a possible implementation, the decoding device may include a processor and a transmission interface. The transmission interface is configured to receive and/or send data. The processor is configured to invoke software instructions stored in the memory, so that the decoding device performs a function in the method example described in the first aspect.

According to a sixth aspect, an encoding device is provided. The encoding device may implement a function in the method example described in the second aspect. The function may be implemented by hardware, or may be implemented by hardware executing corresponding software. The hardware or the software includes one or more modules corresponding to the functions. The encoding device may exist in a product form of a chip.

In a possible implementation, the encoding device may include a processor and a transmission interface. The transmission interface is configured to receive and/or send data. The processor is configured to invoke software instructions stored in the memory, so that the encoding device performs a function in the method example described in the second aspect.

According to a seventh aspect, a computer-readable storage medium is provided, including multiple viewpoint bitstreams obtained by shooting a same scene at multiple viewpoints. Each of the multiple viewpoint bitstreams includes a first type bitstream and a second type bitstream; and a first type bitstream of any viewpoint bitstream in the multiple viewpoint bitstreams and/or a second type bitstream of the viewpoint bitstream include/includes a random access frame serving as a reference frame for decoding the first type bitstream of the viewpoint bitstream. The first type bitstream of the viewpoint bitstream includes a random access frame whose play moment is between play moments of two adjacent random access frames of the first type bitstream of another viewpoint bitstream, and/or the second type bitstream of the viewpoint bitstream includes a random access frame whose play moment is between the play moments of the two adjacent random access frames of the first type bitstream in the another viewpoint bitstream.

In a possible implementation, play moments corresponding to random access frames in a first type bitstream of any viewpoint bitstream are all different from play moments corresponding to random access frames in a first type bitstream of another viewpoint bitstream: or play moments corresponding to random access frames in a first type bitstream of any viewpoint bitstream are all different from play moments corresponding to random access frames in a second type bitstream of another viewpoint bitstream.

According to an eighth aspect, a computer-readable storage medium is provided. The computer-readable storage medium stores instructions. When the instructions are run on a computer or a processor, the computer or the processor is enabled to perform the decoding method or the encoding method provided in any one of the first aspect, the second aspect, or the possible implementations of the first aspect or the second aspect.

According to a ninth aspect, a computer program product is provided. The computer program product includes instructions. When the instructions are run on a computer or a processor, the computer or the processor is enabled to perform the decoding method or the encoding method provided in any one of the first aspect, the second aspect, or the possible implementations of the first aspect or the second aspect.

According to a tenth aspect, a chip system is provided. The chip system includes a processor, and may further include a memory, configured to implement a corresponding function in the foregoing method. The chip system may include a chip, or may include a chip and another discrete device.

According to an eleventh aspect, an encoding and decoding system is provided. The system includes the decoding device in the fifth aspect and the encoding device in the sixth aspect, and has functions of the foregoing aspects and the possible implementations.

It should be noted that various possible implementations in any one of the foregoing aspects may be combined on a premise that the solutions are not contradictory.

DESCRIPTION OF EMBODIMENTS

Figure 1:
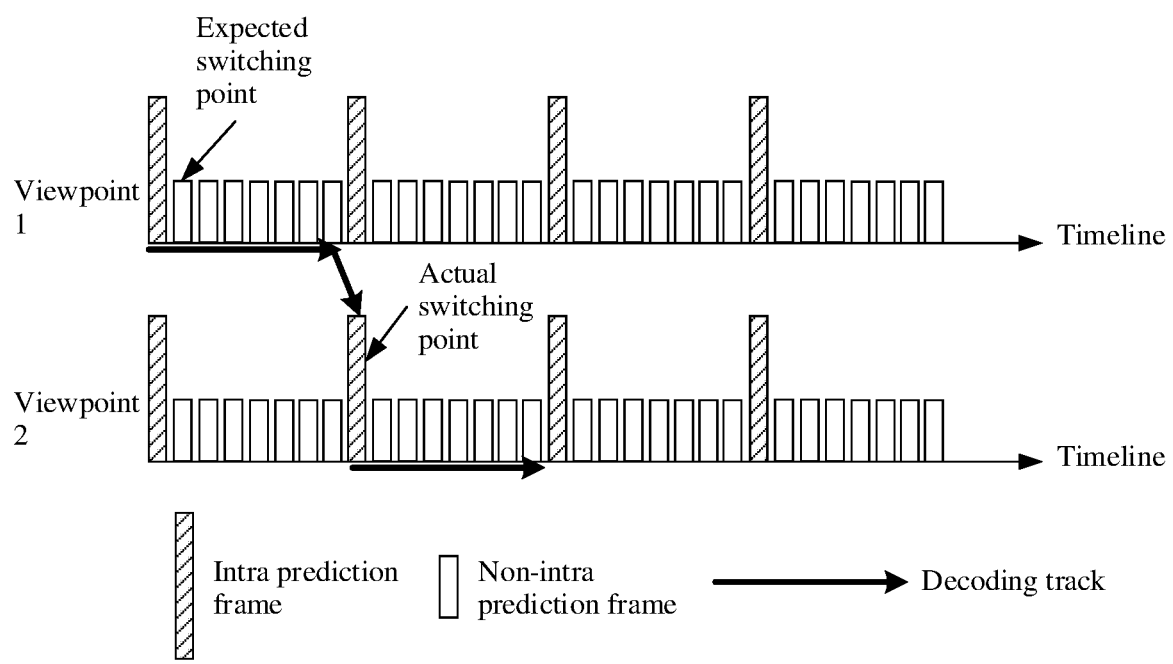
FIG. 1 is a schematic diagram of multiple viewpoint bitstreams.

In embodiments of the present disclosure, to clearly describe technical solutions in embodiments of the present disclosure, words such as "first" and "second" are used to distinguish between same items or similar items whose functions are basically the same. A person skilled in the art may understand that the terms such as "first" and "second" do not limit a quantity and an execution sequence, and the terms such as "first" and "second" do not indicate a definite difference. There is no chronological order or no size order between the technical features described by the "first" and the "second".

In embodiments of the present disclosure, the word "example", "for example", or the like is used to represent giving an example, an illustration, or a description. Any embodiment or design scheme described as an "example" or "for example" in embodiments of the present disclosure should not be explained as being more preferred or having more advantages than another embodiment or design scheme. Exactly, use of the word such as "example" or "for example" is intended to present a relative concept in a specific manner for ease of understanding.

In the descriptions of the present disclosure, "/" represents an "or" relationship between associated objects unless otherwise specified. For example, A/B may represent A or B. The term "and/or" in this application represents only an association relationship for describing associated objects and represents that any of three relationships may exist. For example, A and/or B may represent any one of the three cases: Only A exists, both A and B exist, and only B exists, where A and B may be singular or plural. In addition, in the descriptions of this application, "a plurality of" means two or more than two unless otherwise specified. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

In embodiments of the present disclosure, "at least one" may also be described as "one or more", and "a plurality of" may be "two, three, four, or more". This is not limited in the present disclosure.

Before embodiments of the present disclosure are described, nouns in the present disclosure are explained and described herein. Details are not described in the following.

A viewpoint is a shooting angle in a multi-angle shooting scenario, or may be a video camera position in a multi-angle shooting scenario.

Multi-viewpoint shooting means that two or more video cameras are used to simultaneously shoot a same scene at multiple angles and in multiple orientations, to obtain multi-angle and multi-orientation video streams, so that switching may be performed between video streams at different angles, to improve user experience.

An image frame is a static frame of image. Multiple image frames may form a dynamic video frame sequence, which is coded to form a bitstream. It should be understood that one bitstream includes multiple image frames, and each image frame in the bitstream corresponds to a segment of data.

Intra prediction refers to a coding prediction mode in which decoding can be independently completed without relying on another frame in the field of video encoding and decoding.

An intra prediction frame refers to an image frame in which a prediction manner of all blocks is intra prediction, and decoding of the intra prediction frame can be independently completed without relying on another frame.

Inter prediction refers to a coding prediction mode in which decoding can be completed only by relying on another frame in the field of video encoding and decoding.

An inter prediction frame refers to a frame in which a prediction manner of at least one block is inter prediction.

A random access frame is an image frame that can provide a random access function. Optionally, the random access frame may include an initial frame of a random access segment, or may include an intra prediction frame.

A group of pictures (GOP) stream is a bitstream format that includes periodic intra prediction frames. In the GOP stream, two adjacent intra prediction frames may be at an interval of an inter prediction frame or another non-intra prediction frame.

A play moment refers to a play moment of an image frame in a bitstream. The play moment is a relative value. For example, a play moment of an image frame may be a moment relative to the first image frame in the bitstream, or a play moment of an image frame may be a play moment of the image frame in total play duration of the bitstream. That a play moment of an image frame is after a play moment of another image frame may be understood as that the play moment of the image frame is the same as the play moment of the another image frame, or is greater than the play moment of the another image frame. It should be noted that, in a multi-viewpoint shooting scenario, clocks of different viewpoints are not necessarily synchronized, and absolute times of image frames at a same play moment in different viewpoint bitstreams deviate from each other. Subsequent embodiments of the present disclosure are described with the deviation ignored.

A PTS (presentation time stamp) refers to a mark of generation time of each image frame. The PTS can be used by a player to display video frames in a normal sequence or used for audio and video synchronization. The PTS may be generated by an encoder, or may be generated externally. This is not limited in the present disclosure. The PTS may be used to indicate a play moment of an image frame, and image frames with a same PTS in different bitstreams have a same play moment.

A DTS (decoding time stamp) refers to a mark sequentially made by an encoder on each image frame in an encoding sequence after the encoder re-arranges and encodes frames of a video sequence for better compression performance. For example, the encoder may encode a first arrived frame later. The DTS may be a frame output sequence of the encoder. Therefore, the frame output sequence of the encoder may be inconsistent with the frame shooting sequence, that is, the sequences of the PTS and the DTS are inconsistent. The DTS may be generated by an encoder, or may be generated externally. This is not limited in the present disclosure. It should be noted that, for a low-latency interaction scenario, an example in which the encoding sequence is consistent with the frame shooting sequence is used for description in the present disclosure, and sequences of the DTS and the PTS of a bitstream are consistent.

Strong-interaction scenario refers to a scenario in which a system receives user input and provides real-time feedback, such as games and live streaming interaction.

In a multi-viewpoint shooting scenario, switching between images of different viewpoints is performed in the following manners:

Manner 1: Bitstreams captured by the multiple viewpoints are encoded by using a fixed intra prediction frame. When switching between video images from different angles is performed, the switching can be performed for continuous decoding and displaying only when video decoding of a current viewpoint proceeds to a fixed intra prediction frame of a next viewpoint bitstream.

FIG. 1 shows bitstreams captured by two viewpoints in the manner 1. A user performs an action and triggers switching from a viewpoint 1 to a viewpoint 2 for watching. It is assumed that the user first watches a video of the viewpoint 1 and plans to switch to the viewpoint 2 at a second frame (expected switching point). However, the nearest intra prediction frame of the viewpoint 2 is a ninth frame. Therefore, video decoding and playing of the viewpoint 1 needs to proceed to an eighth frame for switching to the viewpoint 2 at the ninth frame (actual switching point). There is an interval of seven frames between the actual switching point and the expected switching point. Therefore, there is a delay of seven frames in decoding. It is assumed that an interval of intra prediction frames of multiple viewpoint bitstreams is X. In a worst case, there is a decoding delay of approximately X-I frames. If a frame rate is 30 FPS, the delay reaches 233 ms, and the user may perceive obvious slow response of the system.

Manner 2: Each viewpoint prepares two bitstream sets, where one bitstream set is a GOP stream, the interval of intra prediction frames of the GOP stream is set to be large (usually, a time interval such as 1 s, 2 s, or 5 s may be selected), and the other bitstream set are full intra prediction frames (that is, the interval of intra prediction frames is 1).

Figure 2:
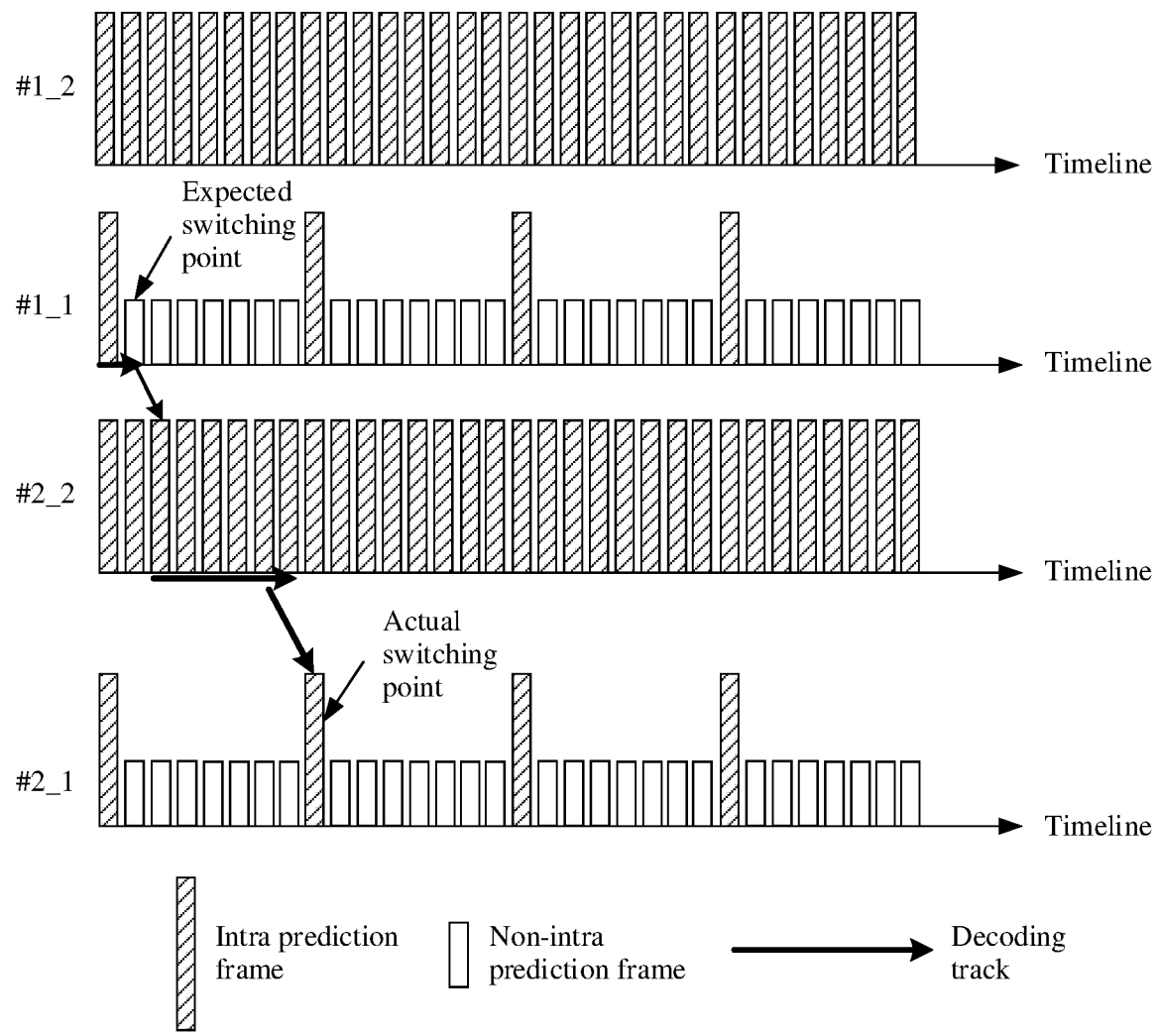
FIG. 2 is another schematic diagram of multiple viewpoint bitstreams.

FIG. 2 shows bitstreams captured by two viewpoints in the manner 2. As shown in FIG. 2, a viewpoint 1 prepares a GOP stream #1_1 and a full intra prediction frame stream #1_2, and a viewpoint 2 prepares a GOP stream #2_1 and a full intra prediction frame stream #2_2. When the user watches a video of the viewpoint 1, a terminal downloads and decodes the GOP stream #1_1. When the user plans, at the second frame, to switch to the viewpoint 2 for watching at a next frame (that is, the third frame, an expected switching point), the terminal downloads the full intra prediction frame stream #2_2 corresponding to the viewpoint 2 and decodes from the third frame of #2_2. In this case, the video of the viewpoint 2 can be presented to the user, the full intra prediction frame stream #2_2 is decoded until a next intra prediction frame (that is, the ninth frame) corresponding to the GOP stream #2_1 of the viewpoint 2 is decoded, and the GOP stream #2_1 of the viewpoint 2 is decoded starting from the ninth frame (the next intra prediction frame) of the GOP stream #2_1.

In this solution, the full intra prediction frame bitstream is used for connection between access frames of the GOP stream, to implement seamless viewpoint switching with single-frame delay. However, in this solution, each viewpoint needs to encode, store, and transmit the full-frame intra prediction frame bitstream. A storage amount and a download amount are large, resulting in costs of storage and bandwidth.

Manner 3: Each viewpoint prepares N bitstream sets, where M is an interval of intra prediction frames in a GOP stream, and the bitstream sets are sequentially encoded with a delay of one frame.

Figure 3:
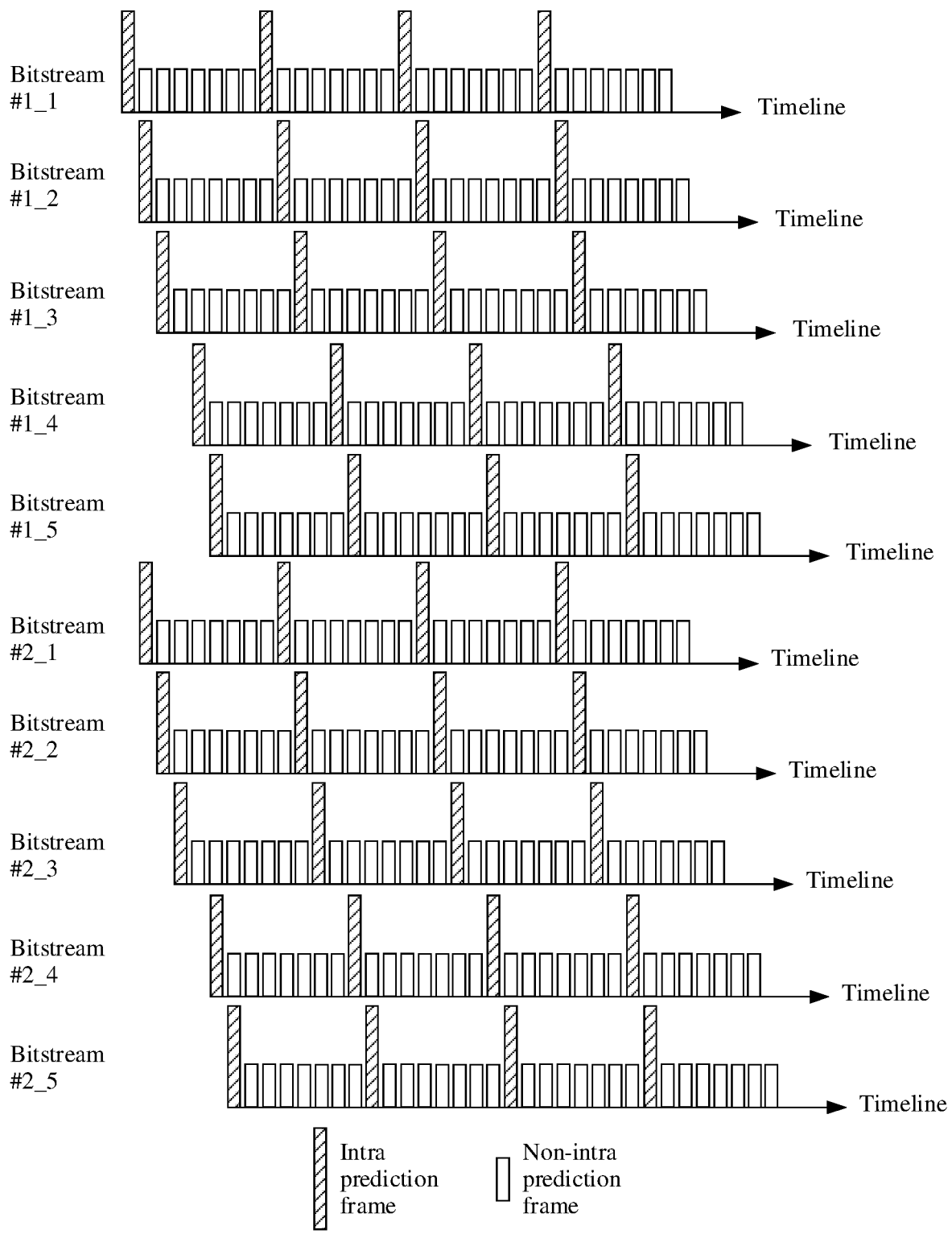
FIG. 3 is still another schematic diagram of multiple viewpoint bitstreams.

FIG. 3 shows bitstreams captured by two viewpoints in the manner 3. In FIG. 3, N=5 is used as an example. A viewpoint 1 prepares five GOP streams, which are denoted as bitstreams #1_1 to #1_5. A viewpoint 2 prepares five GOP streams, which are denoted as streams #2_1 to #2_5.

It is assumed that the user watches a video of the viewpoint 1, and the user plans, at the second frame, to switch to the viewpoint 2 for watching. A bitstream whose second frame of the viewpoint 2 is an intra prediction frame is the bitstream #2_3. Therefore, after the second frame of the bitstream #1_1 of the viewpoint 1 is decoded, the intra prediction frame of the bitstream #2_3 of the viewpoint 2 is decoded and played.

Although the manner 3 implements a minimum switching delay and ensures user experience, each viewpoint requires a large amount of encoding and storage, resulting in high costs of encoding computation and storage.

In view of this, an embodiment of the present disclosure provides an encoding and decoding method. Each viewpoint prepares two types of bitstreams (a first type bitstream and a second type bitstream). A first type bitstream of any viewpoint bitstream is configured to include a random access frame whose play moment is between play moments of two adjacent random access frames of a first type bitstream of another viewpoint bitstream, and/or a second type bitstream of any viewpoint bitstream is configured to include a random access frame whose play moment is between the play moments of the two adjacent random access frames of the first type bitstream of the another viewpoint bitstream. When the another viewpoint bitstream is switched to the viewpoint bitstream, the switching can be performed before playing of a random access segment of the another viewpoint bitstream is completed. This reduces an interval between a switching point expected by the user and a random access frame (access point) of a target viewpoint, reduces a switching delay, implements viewpoint switching with a low switching delay in a multi-viewpoint shooting scenario, and improves user experience.

Figure 4:
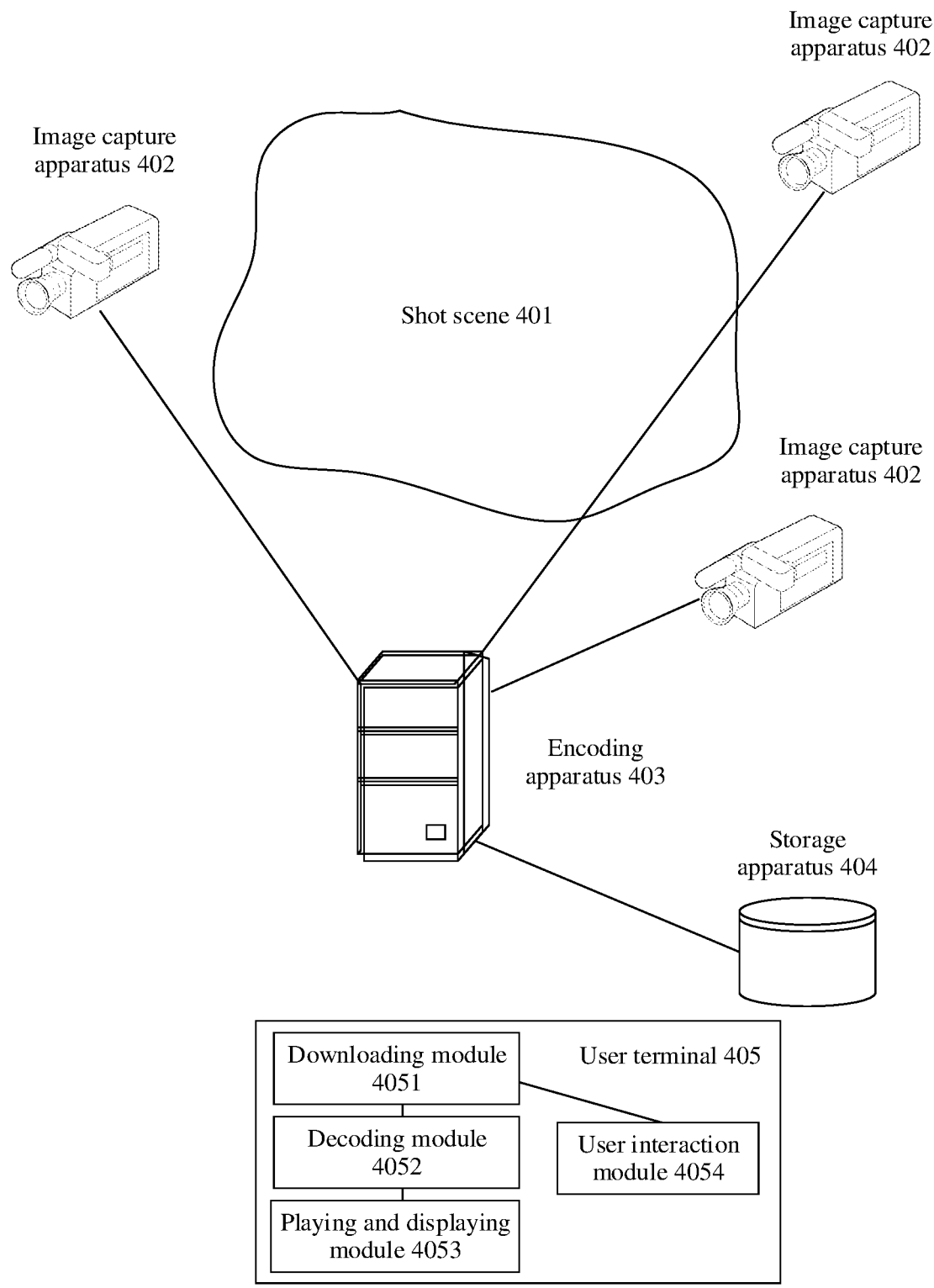
FIG. 4 is a schematic diagram of a multi-viewpoint shooting scenario according to an embodiment of the present disclosure.

The encoding and decoding method provided in this embodiment of the present disclosure may be applicable to a multi-viewpoint shooting scenario shown in FIG. 4. As shown in FIG. 4, the multi-viewpoint shooting scenario includes a photographed scene 401, multiple image capture apparatuses 402 at multiple viewpoints, an encoding apparatus 403 connected to the multiple image capture apparatuses 402, a storage apparatus 404, and a user terminal 405.

The multiple image capture apparatuses 402 at multiple viewpoints, the encoding apparatus 403 connected to the multiple image capture apparatuses 402, and the storage apparatus 404 may be used as an encoder, and the user terminal 405 may be used as a decoder.

The multiple image capture apparatuses 402 at multiple viewpoints are configured to simultaneously shoot the photographed scene 401 at multiple angles and in multiple orientations, to obtain multi-angle and multi-orientation bitstreams, and output YUV videos or compressed bitstreams.

The multiple image capture apparatuses 402 send the obtained video streams or video files to the encoding apparatus 403. The encoding apparatus 403 obtains multiple viewpoint bitstreams according to the encoding method provided in the present disclosure, and stores the multiple viewpoint bitstreams in the storage apparatus 404. Each of the multiple viewpoint bitstreams includes a first type bitstream and a second type bitstream. A first type bitstream of any viewpoint bitstream in the multiple viewpoint bitstreams and/or a second type bitstream of the viewpoint bitstream include/includes a random access frame serving as a reference frame for decoding the first type bitstream of the viewpoint bitstream.

Specifically, if the image capture apparatus 402 outputs an uncompressed video signal, the encoding apparatus 403 may perform video compression encoding on the uncompressed video signal according to a specific configuration, to obtain a viewpoint bitstream. If the image capture apparatus 402 outputs a compressed bitstream, the encoding apparatus 403 may decode the compressed bitstream into an uncompressed video signal, and then compress and encode the uncompressed video signal into a viewpoint bitstream according to a specific configuration.

Further, in an on-demand application, the encoding apparatus 403 may store the obtained viewpoint bitstream in the storage apparatus 404, which is read upon a download request of a terminal. In a live streaming application, the storage apparatus 404 has small cache space.

The user terminal 405 is configured to play the viewpoint bitstreams that are captured by the multiple video cameras 402 for the photographed scene 401. Specifically, the user terminal 405 may include a downloading module 4051, a decoding module 4052, a playing and displaying module 4053, and a user interaction module 4054.

The user interaction module 4054 is configured to receive an interaction instruction from a user.

The downloading module 4051 is configured to respond to the user interaction instruction received by the user interaction module 4054, request a viewpoint bitstream of a viewpoint from the encoder, and cache the viewpoint bitstream delivered by the encoder, for decoding of the decoding module 4052. Alternatively, switching is performed between the viewpoint bitstreams captured by different video cameras 402 based on a user requirement. For example, when the user terminal 405 is playing a viewpoint bitstream of a viewpoint, the user interaction module 4054 obtains an interaction instruction indicating that the user expects to switch to a picture of another viewpoint, and the downloading module 4051 may send a download request to the encoder, to request for the viewpoint bitstream of the another viewpoint.

The decoding module 4052 is configured to decode the viewpoint bitstream downloaded by the downloading module 4051. Optionally, a specific implementation of the decoding module 4052 may include but is not limited to software decoding, hardware decoding, or software and hardware hybrid decoding.

Software decoding refers to implementation by a processor by invoking code. The processor may be a graphics processing unit (GPU), a central processing unit (CPU), a digital signal processor (DSP), an artificial intelligence (AI) chip, or another type of chip.

Hardware decoding refers to a decoding process implemented by using an application-specific integrated circuit (ASIC), a field programmable gate array (FPGA), or another hardware unit.

Software and hardware hybrid decoding refers to software decoding for some units and hardware decoding for some units.

The playing and displaying module 4053 is configured to play, render, and display the video decoded by the decoding module 4052.

It should be noted that, in different scenarios, product forms of devices in the multi-viewpoint shooting scenario shown in FIG. 4 may be different.

For example, the image capture apparatus 402 may be a video camera, and the user terminal 405 may be an electronic device used by the user that has a playing function, for example, a mobile phone, a tablet computer (portable android device, PAD), a smart watch, a smart television, or the like.

It should be noted that a quantity of devices included in the multi-viewpoint shooting scenario shown in FIG. 4 and a specific architecture may be configured based on an actual requirement. This is not limited in this embodiment of the present disclosure. Certainly, FIG. 4 describes only a specific architecture of a multi-viewpoint shooting scenario by using an example, but does not limit the architecture of the multi-viewpoint shooting scenario.

The following describes embodiments of the present disclosure in detail with reference to the accompanying drawings.

Figure 5:
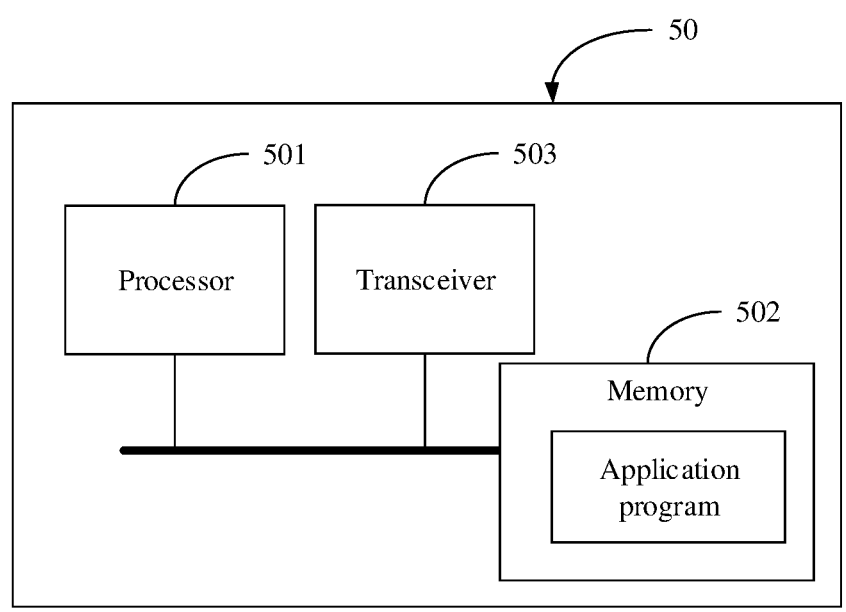
FIG. 5 is a schematic diagram depicting a structure of an image processing device according to an embodiment of the present disclosure.

In one aspect, an embodiment of the present disclosure provides an image processing device, configured to perform the encoding and decoding method provided in the present disclosure. The image processing device may be the encoding apparatus 403 or the user terminal 405 in the shooting scenario shown in FIG. 4. FIG. 5 shows an image processing device 50 related to embodiments of the present disclosure. As shown in FIG. 5, the image processing device 50 may include a processor 501, a memory 502, and a transceiver 503.

The following specifically describes each component of the image processing device 50 with reference to FIG. 5.

The memory 502 may be a volatile memory, such as a random access memory (RAM): or a non-volatile memory, such as a read-only memory (ROM), a flash memory, a hard disk drive (HDD), or a solid-state drive (SSD): or a combination of the foregoing types of memories, configured to store program code, a configuration file, or other content for implementing the method in the present disclosure.

The processor 501 is a control center of the image processing device 50. For example, the processor 501 may be a CPU, may be an ASIC, or may be one or more integrated circuits such as one or more DSPs or one or more FPGAs configured to implement embodiments of the present disclosure.

The transceiver 503 is configured to communicate with another device. The transceiver 503 may be a communication port of the image processing device 50 or another.

In a possible implementation, when the image processing device 50 serves as a decoding device, the decoding device is configured to decode multiple viewpoint bitstreams obtained by shooting a same scene at multiple viewpoints, where each of the multiple viewpoint bitstreams includes a first type bitstream and a second type bitstream. A first type bitstream of any viewpoint bitstream in the multiple viewpoint bitstreams and/or a second type bitstream of the viewpoint bitstream include/includes a random access frame serving as a reference frame for decoding the first type bitstream of the viewpoint bitstream. The processor 501 runs or executes a software program and/or a module stored in the memory 502, and invokes data stored in the memory 502, to perform the following functions:

receiving a switching request when a first image frame in a first type bitstream of a first viewpoint bitstream in the multiple viewpoint bitstreams is played, where the switching request indicates the decoding device to play a second viewpoint bitstream in the multiple viewpoint bitstreams: determining a first random access frame that is in a first type bitstream and/or a second type bitstream of the second viewpoint bitstream and whose play moment is after the first image frame and closest to the first image frame, where the first type bitstream of the second viewpoint bitstream includes a random access frame whose play moment is between play moments of two adjacent random access frames of the first type bitstream of the first viewpoint bitstream, and/or the second type bitstream of the second viewpoint bitstream includes a random access frame whose play moment is between the play moments of the two adjacent random access frames of the first type bitstream of the first viewpoint bitstream, and a play moment of the first image frame is between the play moments of the two adjacent random access frames; and decoding to obtain the first random access frame based on encoded data of the first random access frame in the second viewpoint bitstream, and decoding to obtain and play an image frame that is in the first type bitstream of the second viewpoint bitstream and whose play moment is after the first random access frame by using the first random access frame as a reference frame.

For example, the processor 501 may implement the decoding method provided in the present disclosure through software decoding, hardware decoding, or software and hardware hybrid decoding.

In another possible implementation, when the image processing device 50 serves as an encoding device, the encoding device is configured to encode multiple video frame sequences obtained by shooting a same scene at multiple viewpoints. The processor 501 runs or executes a software program and/or a module stored in the memory 502, and invokes data stored in the memory 502, to perform the following functions:

obtaining multiple video frame sequences obtained by shooting a same scene at multiple viewpoints; and encoding the multiple video frame sequences to obtain multiple viewpoint bitstreams, where a quantity of the multiple video sequences is the same as that of the multiple viewpoint bitstreams, where each of the multiple viewpoint bitstreams includes a first type bitstream and a second type bitstream: a first type bitstream of any viewpoint bitstream in the multiple viewpoint bitstreams and/or a second type bitstream of the viewpoint bitstream include/includes a random access frame serving as a reference frame for decoding the first type bitstream of the viewpoint bitstream: the first type bitstream of the viewpoint bitstream includes a random access frame whose play moment is between play moments of two adjacent random access frames of the first type bitstream of another viewpoint bitstream in the multiple viewpoint bitstreams, and/or the second type bitstream of the viewpoint bitstream includes a random access frame whose play moment is between the play moments of the two adjacent random access frames of the first type bitstream of the another viewpoint bitstream.

Figure 6:
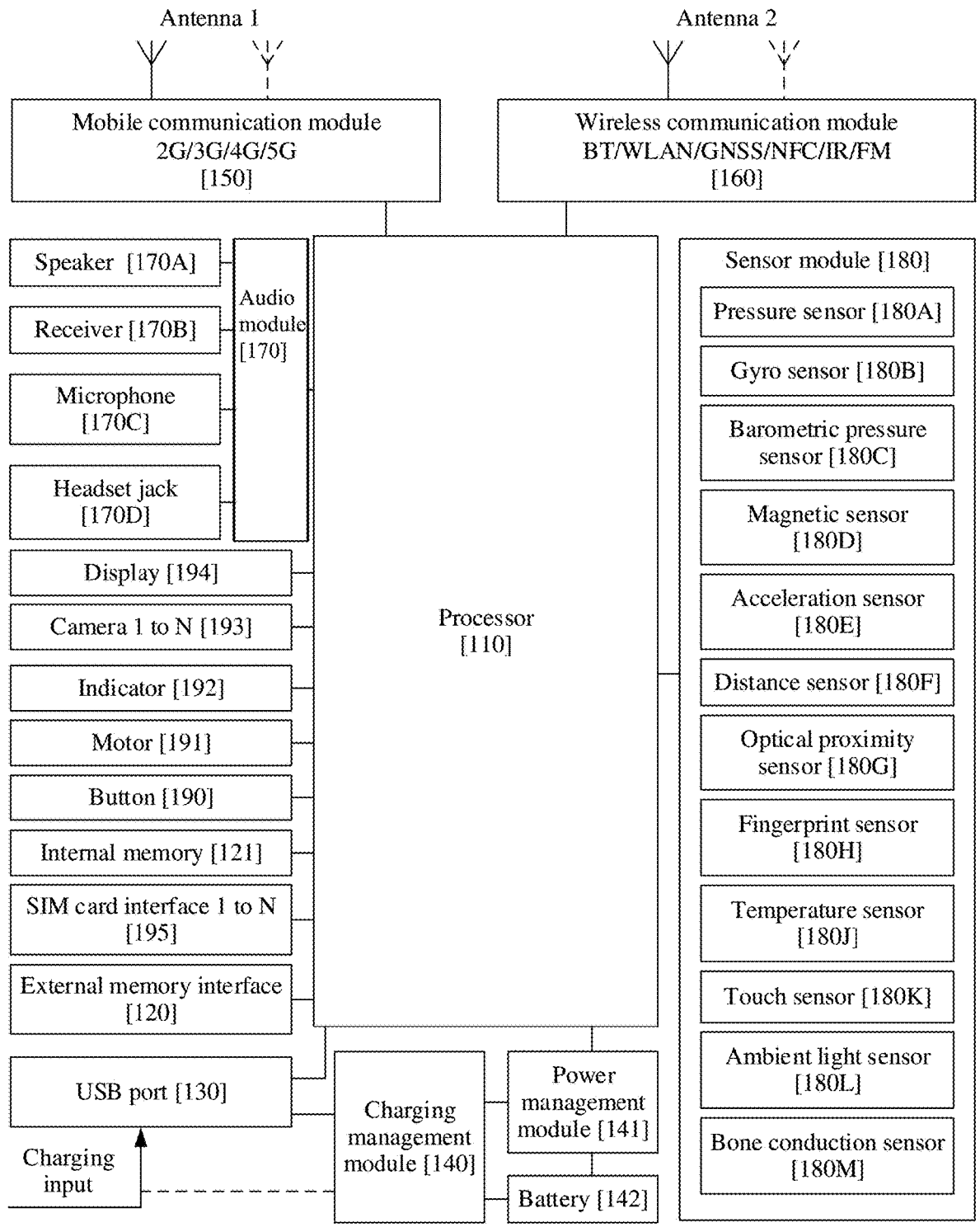
FIG. 6 is a schematic diagram depicting a structure of an electronic device according to an embodiment of the present disclosure.

FIG. 6 is a schematic diagram depicting a structure of an electronic device according to an embodiment of the present disclosure. A structure of the image processing device 50 and the user terminal 405 may be shown in FIG. 6.

As shown in FIG. 6, the electronic device may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment does not constitute a specific limitation on the electronic device. In some other embodiments, the electronic device may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include one or more of an application processor (AP), a modem processor, a GPU, an image signal processor (ISP), a controller, a memory, a video codec, a DSP, a baseband processor, a neural network processing unit (NPU), and the like. Different processing units may be independent components, or may be integrated into one or more processors.

The controller may be a nerve center and a command center of the electronic device. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include one or more of an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a USB port, and the like.

For example, the processor 110 may implement the decoding method provided in the present disclosure through software decoding, hardware decoding, or software and hardware hybrid decoding.

The charging management module 140 is configured to receive a charging input from a charger. The charger may be a wireless charger or a wired charger. In some embodiments of wired charging, the charging management module 140 may receive a charging input of a wired charger through the USB port 130. In some embodiments of wireless charging, the charging management module 140 may receive a wireless charging input through a wireless charging coil of the electronic device. The charging management module 140 supplies power to the electronic device through the power management module 141 while charging the battery 142.

The power management module 141 is configured to connect to the battery 142, the charging management module 140, and the processor 110. The power management module 141 receives input of the battery 142 and the charging management module 140, to supply power to the processor 110, the internal memory 121, an external memory, the display 194, the camera 193, the wireless communication module 160, and the like. The power management module 141 may further be configured to monitor parameters such as a battery capacity, a battery cycle count, and a battery health state (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the electronic device may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the electronic device and that includes a second-generation mobile phone communication technology (2G)/a third-generation mobile phone communication technology (the 3rd generation mobile communication technology, 3G)/a fourth-generation mobile phone communication technology (the 4th generation mobile communication technology, 4G)/a fifth-generation mobile phone communication technology (the 5th generation mobile communication technology, 5G), and the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communication module 150 or another functional module.

The wireless communication module 160 may provide wireless communication solutions applied to the electronic device, for example, a wireless local area network ( ) (such as a wireless fidelity (Wi-Fi) network), bluetooth (BT), a global navigation satellite system (GNSS), frequency modulation (FM), near field communication (NFC), and an infrared (IR) technology. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device, the antenna 1 and the mobile communication module 150 are coupled, and the antenna 2 and the wireless communication module 160 are coupled, so that the electronic device can communicate with a network and another device by using a wireless communication technology. For example, the electronic device may perform a video call or a video conference with another electronic device through the antenna 1 and the mobile communication module 150. The wireless communication technology may include one or more of technologies such as global system for mobile communications (GSM), general packet radio service (GPRS), code division multiple access (CDMA), wideband code division multiple access (WCDMA), time-division code division multiple access (TD-SCDMA), long term evolution (LTE), BT, GNSS, WLAN, NFC, FM, and IR. The GNSS may include one or more of the global positioning system (GPS), the global navigation satellite system (GLONASS), the BeiDou navigation satellite system (BDS), the quasi-zenith satellite system (QZSS), the satellite based augmentation system (SBAS), and the like.

The electronic device implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information. For example, the electronic device may implement operations such as rendering and displaying of the viewpoint bitstream in the solutions of the present disclosure by using the GPU, the display 194, and the application processor.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device may include one or N displays 194, where N is a positive integer greater than 1.

The electronic device may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographed scene. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device may include one or N cameras 193, where N is a positive integer greater than 1. In this embodiment, the camera 193 may be disposed in the electronic device in a hidden manner, or may not be disposed in a hidden manner. This is not specifically limited in this embodiment.

The digital signal processor is configured to process a digital signal.

The video codec is configured to compress or decompress a digital video. The electronic device may support one or more video codecs. In this way, the electronic device may play or record videos in a plurality of coding formats, for example, moving picture experts group (MPEG)-1, MPEG-2, MPEG-3, and MPEG-4.

The NPU is a neural-network (NN) computing processor. The NPU quickly processes input information based on a structure of a biological neural network, for example, based on a transfer mode between human brain neurons; and may further continuously perform self-learning. The NPU can implement applications such as intelligent cognition of the electronic device, for example, image recognition, facial recognition, voice recognition, and text understanding.

The external memory interface 120 may be configured to connect to an external storage card, for example, a micro SD card, to extend a storage capability of the electronic device. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications and data processing of the electronic device. The internal memory 121 may include a program storage area and a data storage area. The program storage area may store an operating system, an application program (for example, a sound playing function or an image playing function) required by at least one function, and the like. The data storage area may store data (such as audio data and a phone book) created when the electronic device is used, and the like. In addition, the internal memory 121 may include a high-speed random access memory, or may include a non-volatile memory such as at least one disk storage device, a flash memory, or a universal flash storage (UFS).

The electronic device may implement audio functions by using the audio module 170, the speaker 170A, the receiver 170B, the microphone 170C, the headset jack 170D, the application processor, and the like. For example, the audio function includes call, music playback, and recording.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an electrical audio signal into a sound signal. The electronic device may be used to listen to music or answer a hands-free call by using the speaker 170A.

The receiver 170B, also referred to as an "earpiece", is configured to convert an electrical audio signal into a sound signal. When a call is answered or voice information is received by using the electronic device, the receiver 170B may be put close to a human ear to receive a voice.

The microphone 170C, also referred to as a "mike" or a "mic", is configured to convert a sound signal into an electrical signal. When making a call, sending voice information, or needing to trigger, by using a voice assistant, the electronic device to perform some functions, the user may make a sound by putting the mouth close to the microphone 170C, and input a sound signal to the microphone 170C. At least one microphone 170C may be disposed in the electronic device. In some other embodiments, two microphones 170C may be disposed in the electronic device, to implement a noise reduction function in addition to capturing a sound signal. In some other embodiments, three, four, or more microphones 170C may alternatively be disposed in the electronic device, to collect a sound signal, reduce noise, identify a sound source, implement a directional recording function, and the like.

The headset jack 170D is configured to connect to a wired headset. The headset jack 170D may be the USB port 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device determines pressure intensity based on a capacitance change. When a touch operation is performed on the display 194, the electronic device detects intensity of the touch operation by using the pressure sensor 180A. The electronic device may also calculate a touch position based on a detection signal of the pressure sensor 180A. In some embodiments, touch operations that are performed in a same touch position but have different touch operation intensity may correspond to different operation instructions.

The gyro sensor 180B may be configured to determine a motion posture of the electronic device. In some embodiments, angular velocities of the electronic device around three axes (namely, axes x, y, and z) may be determined by using the gyro sensor 180B. The gyro sensor 180B may be configured to implement image stabilization during photographing. For example, when a shutter is pressed, the gyro sensor 180B detects a jitter angle of the electronic device, calculates, based on the angle, a distance for which a lens module needs to compensate, and enables the lens to offset jitter of the electronic device through reverse motion, to implement image stabilization. The gyro sensor 180B may also be used in a navigation scenario and a somatic game scenario.

The barometric pressure sensor 180C is configured to measure barometric pressure. In some embodiments, the electronic device calculates an altitude based on a value of the barometric pressure measured by the barometric pressure sensor 180C, to assist in positioning and navigation.

The magnetic sensor 180D includes a Hall sensor. The electronic device may detect opening and closing of a flip cover by using the magnetic sensor 180D. In some embodiments, when the electronic device is a flip phone, the electronic device may detect opening and closing of a flip cover by using the magnetic sensor 180D. Further, a feature such as automatic unlocking upon flip cover opening is set based on a detected opening or closing state of the leather case or a detected opening or closing state of the flip cover.

The acceleration sensor 180E may detect magnitude of accelerations in various directions (usually on three axes) of the electronic device. Magnitude and a direction of gravity can be detected when the electronic device is still. The acceleration sensor 180E may be further configured to identify a posture of the electronic device, and is used in an application such as switching between a landscape mode and a portrait mode or a pedometer.

The distance sensor 180F is configured to measure a distance. The electronic device may measure the distance through infrared or laser. In some embodiments, in a photographing scenario, the electronic device may measure the distance by using the distance sensor 180F, to implement quick focusing.

The optical proximity sensor 180G may include, for example, a light-emitting diode (LED), and an optical detector, for example, a photodiode. The light emitting diode may be an infrared light emitting diode. The electronic device emits infrared light by using the light-emitting diode. The electronic device detects reflected infrared light from a nearby object by using the photodiode. When detecting sufficient reflected light, the electronic device may determine that there is an object near the electronic device. When detecting insufficient reflected light, the electronic device may determine that there is no object near the electronic device. The electronic device may detect, by using the optical proximity sensor 180G, that the user holds the electronic device close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device is in a pocket, to avoid an unintentional touch.

The fingerprint sensor 180H is configured to collect a fingerprint. The electronic device may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device degrades performance of a processor near the temperature sensor 180J, to reduce power consumption and implement thermal protection. In some other embodiments, when the temperature is lower than another threshold, the electronic device heats the battery 142, to avoid an abnormal shutdown of the electronic device caused by a low temperature. In some other embodiments, when the temperature is lower than still another threshold, the electronic device boosts an output voltage of the battery 142, to avoid an abnormal shutdown caused by a low temperature.

The touch sensor 180K is also referred to as a touch panel. The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may be alternatively disposed on a surface of the electronic device, and is located on a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device may receive a button input, and generate a button signal input related to user settings and function control of the electronic device.

The motor 191 may generate a vibration prompt. The motor 191 may be configured to provide an incoming call vibration prompt and a touch vibration feedback. For example, touch operations performed on different applications (for example, photo taking and audio playing) may correspond to different vibration feedback effects. The motor 191 may also correspond to different vibration feedback effects for touch operations performed on different areas of the display 194. Different application scenarios (for example, a time prompt, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device. The electronic device may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device interacts with a network by using the SIM card, to implement functions such as calling and data communication. In some embodiments, the electronic device uses an eSIM, that is, an embedded SIM card. The eSIM card may be embedded into the electronic device, and cannot be separated from the electronic device.

All decoding methods in the following embodiments may be implemented in the electronic device having the foregoing hardware structure.

Figure 7:
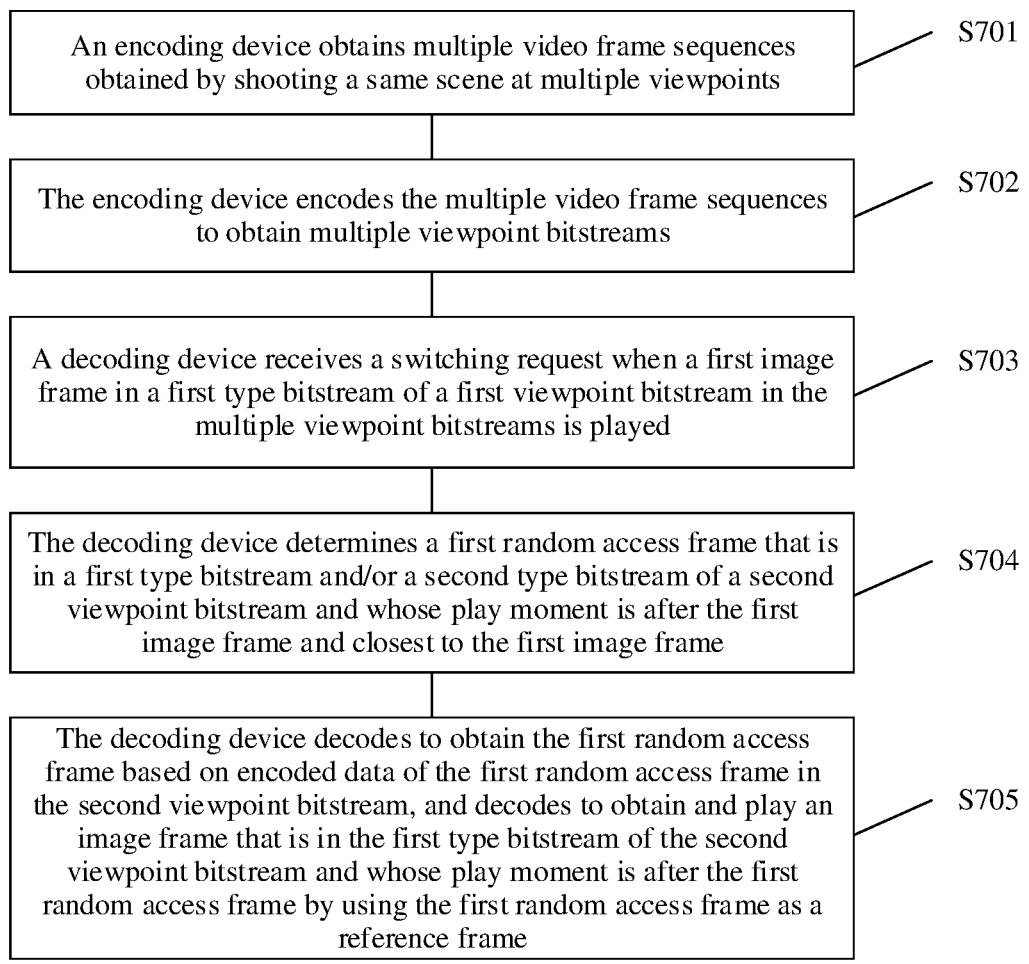
FIG. 7 is a schematic flowchart of an encoding and decoding method according to an embodiment of the present disclosure.

In another aspect, an embodiment of the present disclosure provides an encoding and decoding method, applied to a working process of an encoding device and a decoding device in a multi-viewpoint shooting scenario. The encoding device is configured to encode multiple video frame sequences obtained by shooting a same scene at multiple viewpoints, to obtain multiple viewpoint bitstreams. The decoding device is configured to decode the multiple viewpoint bitstreams obtained by shooting the same scene at the multiple viewpoints. In the following embodiments, an encoding process of an encoding device and a decoding process of a decoding device are used as examples to describe in detail the solutions provided in the present disclosure. As shown in FIG. 7, the method may include the following steps.

S701: An encoding device obtains multiple video frame sequences obtained by shooting a same scene at multiple viewpoints.

The multiple viewpoints are at least two viewpoints. A quantity of the multiple video frame sequences is the same as that of the multiple viewpoints.

In a possible implementation, a photographing apparatus (for example, a camera) is built in the encoding device. There may be multiple encoding devices in S701. Each encoding device is a viewpoint, and is configured to shoot a same scene to obtain a video frame sequence. Each encoding device may shoot the same scene by using the built-in photographing apparatus of the encoding device, to obtain the video frame sequence of the viewpoint.

In another possible implementation, the encoding device is connected to photographing apparatuses at different viewpoints, and the photographing apparatuses at the different viewpoints shoot a same scene to obtain multiple video frame sequences, and then send the multiple video frame sequences to the encoding device. Correspondingly, in S701, the encoding device may receive the multiple video frame sequences obtained by shooting the same scene by the photographing apparatuses at different viewpoints. There may be one or more encoding devices in S701. This is not limited in this embodiment.

S702: The encoding device encodes the multiple video frame sequences to obtain multiple viewpoint bitstreams.

The quantity of the multiple video sequences is the same as that of the multiple viewpoint bitstreams. The multiple viewpoint bitstreams are at least two bitstreams. The quantity of the multiple viewpoints is the same as that of the multiple viewpoint bitstreams.

Specifically, each of the multiple viewpoint bitstreams includes a first type bitstream and a second type bitstream. A first type bitstream of any viewpoint bitstream in the multiple viewpoint bitstreams and/or a second type bitstream of the viewpoint bitstream include/includes a random access frame serving as a reference frame for decoding the first type bitstream of the viewpoint bitstream.

The random access frame serves as an access point for playing the bitstream.

In a possible implementation, the first type bitstream may include random access frames distributed at intervals, and adjacent random access frames are at an interval of a non-random access frame. The second type bitstream includes only random access frames.

It should be noted that, to adapt to performance of different decoding devices or to adapt to different network bandwidths, in a process in which the encoding device encodes the multiple video frame sequences to obtain the multiple viewpoint bitstreams in S702, the video frame sequence of a viewpoint is encoded to obtain the viewpoint bitstream of the viewpoint, and the viewpoint bitstream may include multiple bitstream groups. One bitstream group includes a first type bitstream and a second type bitstream, and parameters of first type bitstreams in different bitstream groups are different, where the parameter may be resolution or a bit rate. The bit rate of the first type bitstream may be the same as or may be different from that of the second type bitstream in a bitstream group.

For example, to adapt to performance of different decoding devices, in a process in which the encoding device encodes the multiple video frame sequences to obtain the multiple viewpoint bitstreams in S702, the encoding device encodes a video frame sequence of one viewpoint to obtain two types of bitstreams of different resolutions. The viewpoint bitstream of one viewpoint may include two bitstream groups. One bitstream group is 720 P bitstreams (including a 720 P first type bitstream and a 720 P second type bitstream), and the other bitstream group is 1080 P streams (including a 1080 P first type bitstream and a 1080 P second type bitstream). For example, to adapt to different bandwidth requirements, in a process in which the encoding device encodes the multiple video frame sequences to obtain the multiple viewpoint bitstreams in S702, the encoding device may encode a video frame sequence of one viewpoint to obtain two types of bitstreams with different bit rates. The viewpoint bitstream of one viewpoint may include two bitstream groups. One bitstream group includes a first type bitstream at a bit rate of 3 megabits per second (million bits per second, Mbps) and a second type bitstream at a bit rate of 3 Mbps or another bit rate, and the other group of streams is a first type bitstream at a bit rate of 500 kilo bits per second (kbps) and a second type bitstream at a bit rate of 500 kbps or another bit rate.

It should be noted that when one viewpoint bitstream includes multiple bitstream groups, the following description of any viewpoint bitstream is a bitstream group in the viewpoint bitstream.

Specifically, in the multiple viewpoint bitstreams, the random access frame of the second type bitstream of the viewpoint bitstream is used to: when an image frame serving as a reference frame in the first type bitstream of the viewpoint bitstream is unavailable, replace the unavailable reference frame in the first type bitstream of the viewpoint bitstream; and serve as a reference frame of an image frame that refers to the unavailable reference frame in the first type bitstream of the viewpoint bitstream.

In another possible implementation, the second type bitstream of any viewpoint bitstream in the multiple viewpoint bitstreams includes any random access frame, the random access frame is an intra prediction frame, and an inter prediction of an inter prediction coding frame that is in the first type bitstream of the viewpoint bitstream and whose play moment is after the play moment of the random access frame refers only to at least one of the random access frame, an image frame that is in the first type bitstream of the viewpoint bitstream and whose play moment is at the play moment of the random access frame, or an image frame that is in the first type bitstream of the viewpoint bitstream and whose play moment is after the play moment of the random access frame.

In a possible implementation, an inter prediction of an inter prediction coding frame that is in the first type bitstream of the viewpoint bitstream and whose play moment is after the play moment of the random access frame refers only to one or two of the random access frame, an image frame that is in the first type bitstream of the viewpoint bitstream and whose play moment is at the play moment of the random access frame, or an image frame that is in the first type bitstream of the viewpoint bitstream and whose play moment is after the play moment of the random access frame.

For example, when a first random access frame is an image frame in the second type bitstream of a second viewpoint bitstream, and the first random access frame is an intra prediction frame, an inter prediction of an inter prediction coding frame that is in the first type bitstream of the second viewpoint bitstream and whose play moment is after the play moment of the first random access frame may refer to the first random access frame, an image frame that is in the first type bitstream of the second viewpoint bitstream and whose play moment is at the play moment of the first random access frame, or an image frame that is in the first type bitstream of the second viewpoint bitstream and whose play moment is after the play moment of the first random access frame.

For example, when a first random access frame is an image frame in the second type bitstream of a second viewpoint bitstream, and the first random access frame is an intra prediction frame, an inter prediction of an inter prediction coding frame that is in the first type bitstream of the second viewpoint bitstream and whose play moment is after the play moment of the first random access frame may refer to any two of the first random access frame, an image frame that is in the first type bitstream of the second viewpoint bitstream and whose play moment is at the play moment of the first random access frame, or an image frame that is in the first type bitstream of the second viewpoint bitstream and whose play moment is after the play moment of the first random access frame.

In another possible implementation, the second type bitstream of any viewpoint bitstream includes any random access frame, the random access frame is an intra prediction frame, and an inter prediction of an inter prediction coding frame that is in the first type bitstream of the viewpoint bitstream and whose play moment is after the play moment of the random access frame does not refer to an image frame that is in the second type bitstream of the viewpoint bitstream and whose play moment is after the play moment of the random access frame.

In another possible implementation, the second type bitstream of any viewpoint bitstream includes any random access frame, the random access frame is an intra prediction frame, and an inter prediction of an inter prediction coding frame that is in the first type bitstream of the viewpoint bitstream and whose play moment is after the play moment of the random access frame does not refer to an image frame that is in the first type bitstream of the viewpoint bitstream and whose play moment is before the play moment of the random access frame.

Figure 8:
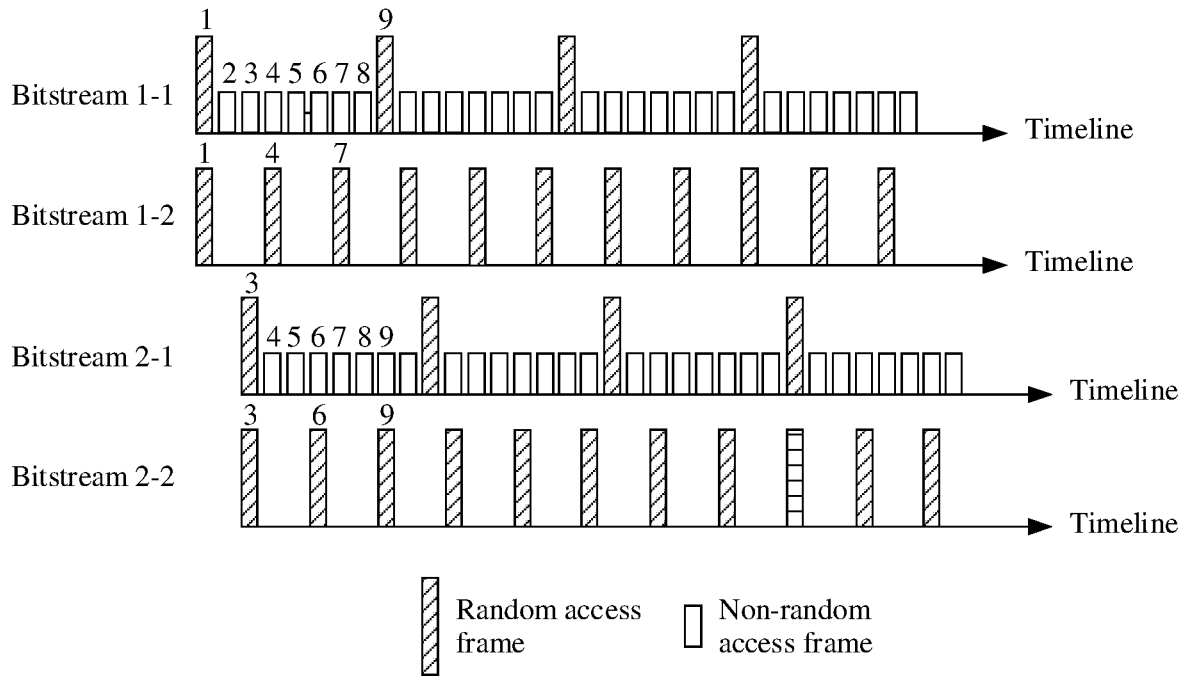
FIG. 8 to FIG. 18 are schematic diagrams of multiple viewpoint bitstreams according to an embodiment of the present disclosure.

For example, viewpoint bitstreams (a viewpoint bitstream 1 and a viewpoint bitstream 2) of two viewpoints obtained by the encoding device through encoding in S702 may be shown in FIG. 8. The viewpoint bitstream 1 includes a first type bitstream (a bitstream 1-1) and a second type bitstream (a bitstream 1-2), and the viewpoint bitstream 2 includes a first type bitstream (a bitstream 2-1) and a second type bitstream (a bitstream 2-2). The second type bitstream (the bitstream 1-2) of the viewpoint bitstream 1 includes a random access frame at a play moment 4, and an inter prediction of an inter prediction coding frame (inter prediction frames at play moments 5/6/7/8) that is in the first type bitstream (the bitstream 1-1) of the viewpoint bitstream 1 and whose play moment is after the play moment 4 refers only to the random access frame at the play moment 4 in the bitstream 1-2, and an image frame that is in the first type bitstream of the viewpoint bitstream 1 and whose play moment is after the play moment 4. The inter prediction of the inter prediction coding frame (the inter prediction frames at the play moments 5/6/7/8) that is in the first type bitstream (the bitstream 1-1) of the viewpoint bitstream 1 and whose play moment is after the play moment 4 does not refer to an image frame that is in the first type bitstream of the viewpoint bitstream 1 and whose play moment is before the play moment 4. The inter prediction of the inter prediction coding frame (the inter prediction frames at the play moments 5/6/7/8) that is in the first type bitstream (the bitstream 1-1) of the viewpoint bitstream 1 and whose play moment is after the play moment 4 does not refer to an image frame that is in the bitstream 1-2 and whose play moment is after the play moment 4.

For example, the first type bitstream includes intra prediction frames distributed at intervals, two adjacent intra prediction frames are at an interval of an inter prediction frame, and image frames in the second type bitstream may be all intra prediction frames.

For example, a type of the image frame in the second type bitstream is an I-frame, a P-frame, or a B-frame whose coding block prediction modes are all intra prediction.

An I-frame (image) is an intra-frame coded image whose amount of transmitted data is compressed by removing image space redundancy information as much as possible, which is intra-frame compression. The image of the frame is left intact, and only data of the frame is needed for decoding.

A P-frame (image) is a coded image whose amount of transmitted data is compressed by fully reducing temporal redundancy information of a previous coded frame in an image sequence, and is also referred to as a prediction frame. A P-frame is predicted based on a previous P-frame or an I-frame. Same information or data is compared between the P-frame and the previous P-frame or I-frame, that is, interframe compression is performed based on motion characteristics. A P-frame represents a difference between the frame and a previous I frame (or P frame). During decoding, the previously buffered image is combined with the difference defined in this frame to generate a final image.

A B-frame (image) is a coded image whose amount of transmitted data is compressed by considering temporal redundancy information between a previous encoded frame in a source image sequence and an encoded frame after the B-frame in the source image sequence, and is also referred to as a bidirectional prediction frame. A B-frame algorithm is an inter-frame compression algorithm for bidirectional prediction. A B-frame is a frame with bidirectional differences. That is, a B-frame records differences between the B-frame and a frame before and after the B-frame. For decoding of the B-frame, a previous buffered picture needs to be obtained, and a subsequent picture also needs to be decoded. A final picture is obtained by superimposing data of the previous picture, the subsequent picture, and the current frame.

Specifically, in S702, the encoding device encodes the multiple video frame sequences to obtain the multiple viewpoint bitstreams, and a first type bitstream of any viewpoint bitstream includes a random access frame whose play moment is between play moments of two adjacent random access frames of a first type bitstream of another viewpoint bitstream in the multiple viewpoint bitstreams, and/or a second type bitstream of the viewpoint bitstream includes a random access frame whose play moment is between the play moments of the two adjacent random access frames of the first type bitstream of the another viewpoint bitstream.

Two adjacent random access frames mean that there is no random access frame between the two adjacent random access frames, but there may be a non-random access frame.

For example, as shown in FIG. 8, a random access frame at a play moment 3 in the first type bitstream (the bitstream 2-1) of the viewpoint bitstream 2 is between play moments of two adjacent random access frames in the first type bitstream (the bitstream 1-1) of the viewpoint bitstream 1 (between random access frames at a play moment 1 and a play moment 9), and random access frames at a play moment 3, a play moment 6, and a play moment 9 in the second type bitstream (the bitstream 2-2) of the viewpoint bitstream 2 are between the play moments of the two adjacent random access frames in the first type bitstream (the bitstream 1-1) of the viewpoint bitstream 1 (between the play moment 1 and the play moment 9).

For example, the following provides several specific implementations of the multiple viewpoint bitstreams, but does not constitute a specific limitation.

Implementation 1: Play moments corresponding to random access frames in a first type bitstream of any viewpoint bitstream are all different from play moments corresponding to random access frames in a first type bitstream of another viewpoint bitstream: or play moments corresponding to random access frames in a first type bitstream of any viewpoint bitstream are all different from play moments corresponding to random access frames in a second type bitstream of another viewpoint bitstream.

In the implementation 1, locations of random access frames in first type bitstreams of different viewpoint bitstreams are alternate, or locations of random access frames in a first type bitstream of any viewpoint bitstream and a second type bitstream of another viewpoint bitstream are alternate. In this way, when switching is performed between different viewpoint bitstreams, a distance between an expected switching point and a next random access frame that is in the target viewpoint bitstream and whose play moment is after the expected switching point is shortened.

Implementation 2: In the multiple viewpoint bitstreams, play moments corresponding to random access frames in a first type bitstream of any viewpoint bitstream are all different from play moments corresponding to random access frames in a second type bitstream of the viewpoint bitstream.

Implementation 3: In the multiple viewpoint bitstreams, $i^{th}$ random access frames in first type bitstreams of two adjacent viewpoint bitstreams in a preset viewpoint order are at an interval of N frames.

i is greater than or equal to 1, and is less than or equal to a total quantity of random access frames in the viewpoint bitstream. N is greater than or equal to 1.

In other words, in the implementation 3, in the multiple viewpoint bitstreams, in first type bitstreams of two adjacent viewpoint bitstreams in a preset viewpoint order, random access frames with a same sequence number are at an interval of N frames, and the sequence number indicates which random access frame the random access frame is in the first bitstream.

Specifically, in the multiple viewpoint bitstreams, spacing between random access frames in first type bitstreams of all viewpoint bitstreams is the same.

In a possible implementation, N may be 1 or 2.

Optionally, in the multiple viewpoint bitstreams, the $i^{th}$ random access frames in the first type bitstreams of the two adjacent viewpoint bitstreams in the preset viewpoint order being at an interval of N frames may be implemented in any one of the following two manners:

Implementation 1: In the multiple viewpoint bitstreams, the $i^{th}$ random access frames in the first type bitstreams of the two adjacent viewpoint bitstreams in the preset viewpoint order are alternately at an interval of N frames.

Being alternately at an interval means that the $i^{th}$ random access frames in the first type bitstreams of the two adjacent viewpoint bitstreams in the preset viewpoint order are at an interval of N frames, and play moments of $i^{th}$ random access frames in the first type bitstreams of viewpoint bitstreams of two viewpoints at an interval of one viewpoint.

The preset viewpoint order may be configured based on an actual requirement. This is not limited in this embodiment. For example, the preset viewpoint sequence may be a geographical location order, or the preset viewpoint sequence may theoretically be a user preference order, or another order.

Figure 9:
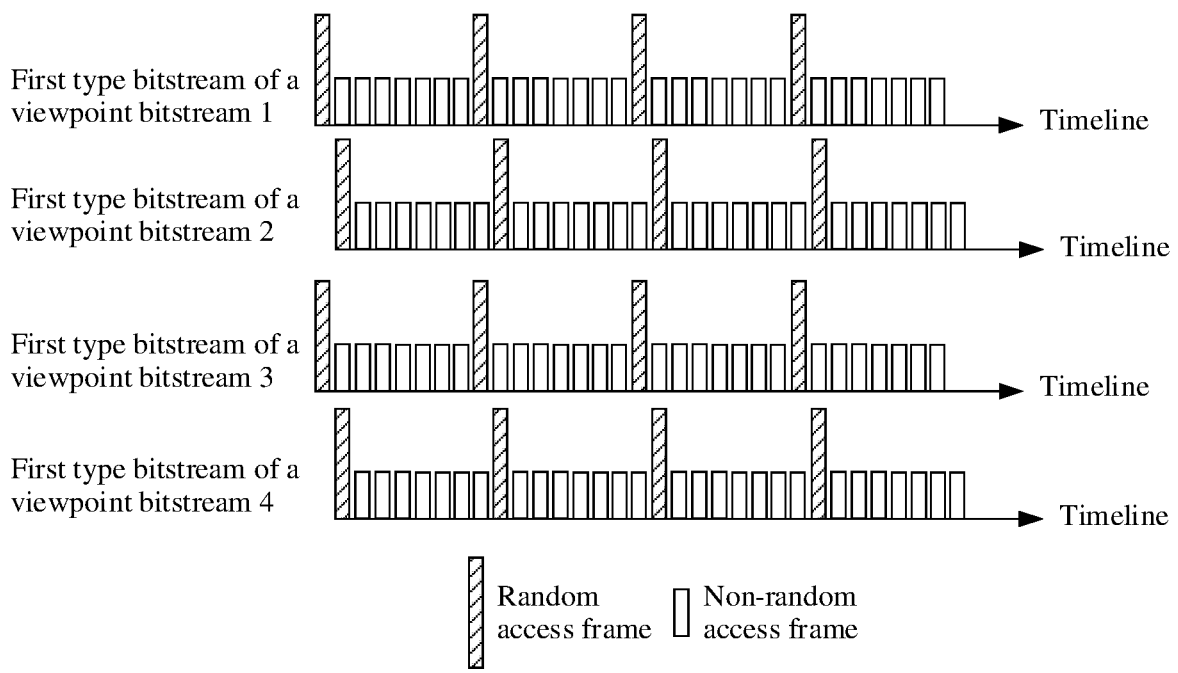

For example, FIG. 9 shows first type bitstreams of four viewpoint bitstreams, and the four viewpoint bitstreams are recorded as a viewpoint bitstream 1 to a viewpoint bitstream 4 according to a preset viewpoint order. It is assumed that N is 1. As shown in FIG. 9, the $i^{th}$ random access frame of the first type bitstream of the viewpoint 1 and the $i^{th}$ random access frame of the first type bitstream of the viewpoint 2 are at an interval of one frame (i is greater than or equal to 1, and less than or equal to 4 in FIG. 9), the $i^{th}$ random access frame of the first type bitstream of the viewpoint 2 and the $i^{th}$ random access frame of the first type bitstream of the viewpoint 3 are at an interval of one frame, the $i^{th}$ random access frame of the first type bitstream of the viewpoint 3 and the $i^{th}$ random access frame of the first type bitstream of the viewpoint 4 are at an interval of one frame, the play moment of the $i^{th}$ random access frame of the first type bitstream of the viewpoint one is the same as the play moment of the $i^{th}$ random access frame of the first type bitstream of the viewpoint 3, and the play moment of the $i^{th}$ random access frame of the first type bitstream of the viewpoint 2 is the same as the play moment of the $i^{th}$ random access frame of the first type bitstream of the viewpoint 4.

Implementation 2: In the multiple viewpoint bitstreams, the $i^{th}$ random access frames in the first type bitstreams of all viewpoint bitstreams in the preset viewpoint order are successively staggered by N frames backward.

It should be noted that the preset viewpoint order is described in the foregoing implementation 1, and details are not described herein again.

Figure 10:
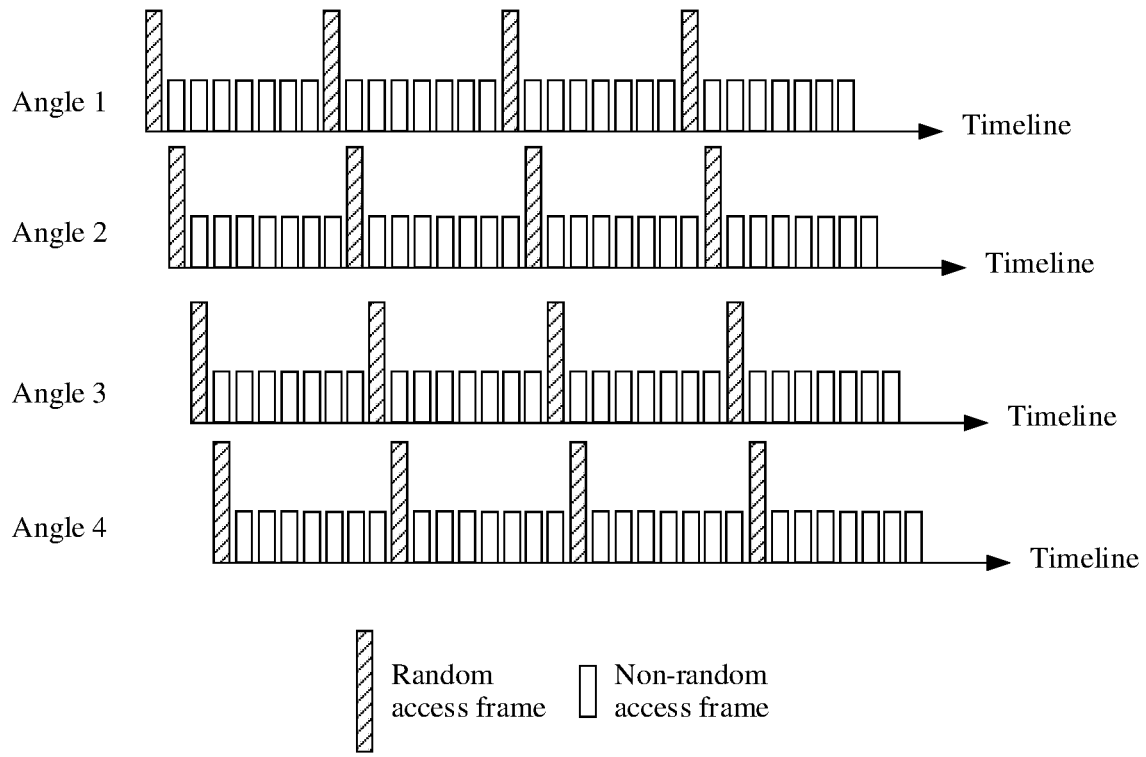

For example, FIG. 10 shows first type bitstreams of four viewpoint bitstreams, and the four viewpoint bitstreams are recorded as a viewpoint bitstream 1 to a viewpoint bitstream 4 according to a preset viewpoint order. It is assumed that N is 1. As shown in FIG. 10, the $i^{th}$ random access frame of the first type bitstream of the viewpoint 2 and the $i^{th}$ random access frame of the first type bitstream of the viewpoint 1 are staggered by one frame backward, the $i^{th}$ random access frame of the first type bitstream of the viewpoint 3 and the $i^{th}$ random access frame of the first type bitstream of the viewpoint 2 are staggered by one frame backward, and the $i^{th}$ random access frame of the first type bitstream of the viewpoint 4 and the $i^{th}$ random access frame of the first type bitstream of the viewpoint 3 are staggered by one frame backward.

It should be noted that a specific encoding process in S702 may be configured based on an actual requirement. This is not limited in this embodiment. For example, in S702, encoding may be performed in a bitstream format defined by the ITU-T H.264 and H.265 in the HEVC standard.

Specifically, the first type bitstream and the second type bitstream of any viewpoint bitstream are obtained by the encoding device by encoding a same video frame sequence. The second type bitstream of the viewpoint bitstream is obtained by encoding a subsequence of the same video frame sequence, adjacent image frames in the subsequence are at an interval of M frames in the same video sequence, and M is greater than or equal to 1.

It should be noted that, encoding to obtain an image frame at an interval of M frames and encoding to obtain an image frame every M+1 frames are equivalent concepts, and may be replaced with each other.

In a possible implementation, M is 1 or 2.

For example, as shown in FIG. 8, the first type bitstream (the bitstream 1-1) and the second type bitstream (the bitstream 1-2) of the viewpoint bitstream 1 are obtained by the encoding device by encoding a same video frame sequence, where the second type bitstream (the bitstream 1-2) is obtained by encoding a subsequence of the same video frame sequence, and adjacent image frames in the subsequence are at an interval of two frames in the same video sequence, that is, encoding to obtain an image frame is performed every three video frames in the same video frame sequence, to obtain the second type bitstream (bitstream 1-2).

Figure 11:
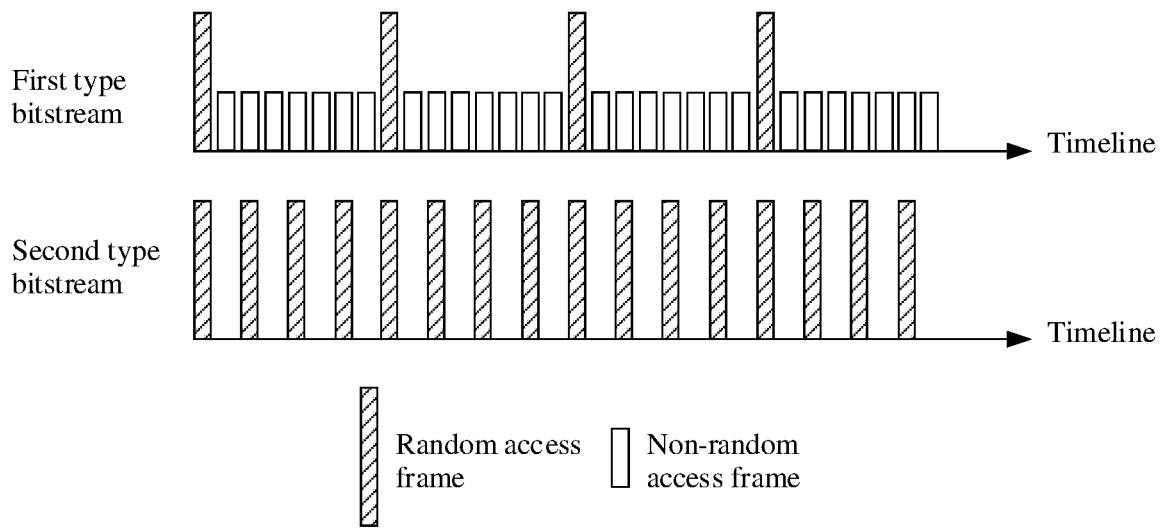

For example, FIG. 11 shows the first type bitstream and the second type bitstream of a viewpoint bitstream, where M is 1. As shown in FIG. 11, encoding to obtain a random access frame is performed every two frames in the second type bitstream of the viewpoint bitstream, and the random access frames in the second type bitstream are at an interval of one frame.

In a possible implementation, in the multiple viewpoint bitstreams, a transmission frame may not be stored for an image frame in the second type bitstream of any viewpoint bitstream and an image frame in the first type bitstream of the viewpoint bitstream that have a same PTS (indicating the play moment), to improve transmission efficiency and reduce a bandwidth requirement.

After S702, the encoding device stores the viewpoint bitstreams of the multiple viewpoints, for example, the viewpoint bitstreams are stored in a storage device in an on-demand scenario, or stored in a cache in a live streaming scenario, and the decoding device downloads, decodes and plays the viewpoint bitstreams. It is assumed that the decoding device downloads, decodes, and plays the first type bitstream of the first viewpoint bitstream in the multiple viewpoint bitstreams based on a user requirement. In a process in which the decoding device decodes and plays the first viewpoint bitstream, the following S703 to S705 describe a decoding processing process of the decoding device when the user requests to switch to play the second viewpoint bitstream in the multiple viewpoint bitstreams. The first viewpoint bitstream and the second viewpoint bitstream are any bitstream in the multiple viewpoint bitstreams.

S703: The decoding device receives a switching request when a first image frame in the first type bitstream of the first viewpoint bitstream in the multiple viewpoint bitstreams is played.

The switching request indicates the decoding device to play the second viewpoint bitstream in the multiple viewpoint bitstreams. The first viewpoint bitstream and the second viewpoint bitstream are any viewpoint bitstream in the multiple viewpoint bitstreams.

In a possible implementation, the switching request indicates the decoding device to play the second viewpoint bitstream in the multiple viewpoint bitstreams at a next play moment.

In a possible implementation, the switching request is input by a user of the decoding device.

In another possible implementation, the switching request may be triggered by an instruction (for example, an information flow includes the instruction for triggering the switching request), or the switching request may be triggered by some operations (for example, a file reading operation).

It should be noted that a manner of obtaining the switching request is not specifically limited in the present disclosure.

After the decoding device receives the switching request in S703, the decoding device performs S704.

It should be noted that, when a viewpoint bitstream includes multiple bitstream groups (a bitstream group includes a first type bitstream and a second type bitstream), switching from the first viewpoint bitstream to the second viewpoint bitstream may be switching to a target bitstream group (the bitstream group to be played after switching) in the second viewpoint bitstream. The target bitstream group may be a bitstream group having a same parameter (resolution, bit rate, or another) as the first viewpoint bitstream that is played, or a bitstream group having a different parameter (resolution, bit rate, or another) from the first viewpoint bitstream that is played. This is not limited in the present disclosure.

In a possible implementation, the multiple bitstream groups included in one viewpoint bitstream have different resolutions. When the decoding device supports a fixed resolution, switching from the first viewpoint bitstream to the second viewpoint bitstream may be switching between bitstream groups with a same resolution in the two viewpoint bitstreams, and the target bitstream group is a bitstream group in the second viewpoint bitstream having a same resolution as the first viewpoint bitstream that is played.

In another possible implementation, the multiple bitstream groups included in one viewpoint bitstream have different resolutions. When the decoding device supports variable, switching from the first viewpoint bitstream to the second viewpoint bitstream may be switching between bitstream groups with different resolutions in the two viewpoint bitstreams, and the target bitstream group is a bitstream group in the second viewpoint bitstream having a different resolution from the first viewpoint bitstream that is played.

In another possible implementation, the multiple bitstream groups included in one viewpoint bitstream have different bit rates. When the network bandwidth is fixed, switching from the first viewpoint bitstream to the second viewpoint bitstream may be switching between bitstream groups with a same bit rate in the two viewpoint bitstreams, and the target bitstream group is a bitstream group in the second viewpoint bitstream having a same bit rate as the first viewpoint bitstream that is played.

In another possible implementation, the multiple bitstream groups included in one viewpoint bitstream have different bit rates. When the network bandwidth changes, switching from the first viewpoint bitstream to the second viewpoint bitstream may be switching between bitstream groups with different bit rates in the two viewpoint bitstreams, and the target bitstream group is a bitstream group in the second viewpoint bitstream having a different bit rate from the first viewpoint bitstream that is played.

S704: The decoding device determines the first random access frame that is in the first type bitstream and/or the second type bitstream of the second viewpoint bitstream and whose play moment is after the first image frame and closest to the first image frame.

It should be noted that when one viewpoint bitstream includes multiple bitstream groups (one bitstream group includes a first type bitstream and a second type bitstream), the second viewpoint bitstream described in S704 is the target bitstream group in the second viewpoint bitstream. When one viewpoint bitstream includes one bitstream group (the bitstream group includes a first type bitstream and a second type bitstream), the second viewpoint bitstream described in S704 is the bitstream group included in the second viewpoint bitstream.

Specifically, the first viewpoint bitstream and the second viewpoint bitstream are any one of the multiple viewpoint bitstreams described in S702. Therefore, the first viewpoint bitstream and the second viewpoint bitstream have a feature of any one of the multiple viewpoint bitstreams described in S702.

In a possible implementation, the first type bitstream of the second viewpoint bitstream includes a random access frame whose play moment is between play moments of two adjacent random access frames of the first type bitstream of the first viewpoint bitstream, and/or the second type bitstream of the second viewpoint bitstream includes a random access frame whose play moment is between the play moments of the two adjacent random access frames of the first type bitstream in the first viewpoint bitstream. The play moment of the first image frame is between the play moments of the two adjacent random access frames.

In another possible implementation, play moments corresponding to random access frames in the first type bitstream of the first viewpoint bitstream are all different from play moments corresponding to random access frames in the first type bitstream of the second viewpoint bitstream: or play moments corresponding to random access frames in the first type bitstream of the first viewpoint bitstream are all different from play moments corresponding to random access frames in the second type bitstream of the second viewpoint bitstream.

In a possible implementation, play moments corresponding to random access frames in the first type bitstream of the second viewpoint bitstream are all different from play moments corresponding to random access frames in the second type bitstream of the second viewpoint bitstream.

Specifically, in S704, the decoding device determining the first random access frame that is in the first type bitstream and/or the second type bitstream of the second viewpoint bitstream and whose play moment is after the first image frame and closest to the first image frame may be specifically implemented as follows: The decoding device determines, between a next random access frame that is in the first type bitstream of the second viewpoint bitstream and whose play moment is after the first image frame and a next random access frame that is in the second type bitstream of the second viewpoint bitstream and whose play moment is after the first image frame, a random access frame whose play moment is closest to the first image frame as the first random access frame.

In a possible implementation, the first random access frame being a random access frame whose play moment is after the first image frame and closest to the first image frame may include: The play moment of the first random access frame may be the same as that of the first image frame, or the play moment of the first random access frame may be different from that of the first image frame.

Optionally, the first random access frame may be a random access frame in the first type bitstream of the second viewpoint bitstream, or the first random access frame may be a random access frame in the second type bitstream of the second viewpoint bitstream.

In a possible implementation, the play moment corresponding to the first random access frame is before a play moment corresponding to a second random access frame, and the second random access frame is a random access frame that is in the first type bitstream of the first viewpoint bitstream and that is after the first image frame and closest to the first image frame.

Specifically, an inter prediction of an inter prediction coding frame that is in the first type bitstream of the second viewpoint bitstream and whose play moment is after the play moment of the first random access frame refers only to the first random access frame, and/or an image frame that is in the first type bitstream of the second viewpoint bitstream and whose play moment is after the play moment of the first random access frame.

When the first random access frame is a random access frame in the second type bitstream of the second viewpoint bitstream, an inter prediction of an inter prediction coding frame that is in the first type bitstream of the second viewpoint bitstream and whose play moment is after the play moment of the first random access frame refers only to the first random access frame, and an image frame that is in the first type bitstream of the second viewpoint bitstream and whose play moment is after the play moment of the first random access frame, and does not refer to an image frame that is in the first type bitstream of the second viewpoint bitstream and whose play moment is before the play moment of the first random access frame.

When the first random access frame is a random access frame in the first type bitstream of the second viewpoint bitstream, an inter prediction of an inter prediction coding frame that is in the first type bitstream of the second viewpoint bitstream and whose play moment is after the play moment of the first random access frame refers only to the first random access frame, and an image frame that is in the first type bitstream of the second viewpoint bitstream and whose play moment is after the play moment of the first random access frame, and does not refer to an image frame that is in the first type bitstream of the second viewpoint bitstream and whose play moment is before the play moment of the first random access frame, and does not refer to an image frame that is in the second type bitstream of the second viewpoint bitstream and whose play moment is after the play moment of the first random access frame.

Figure 12:
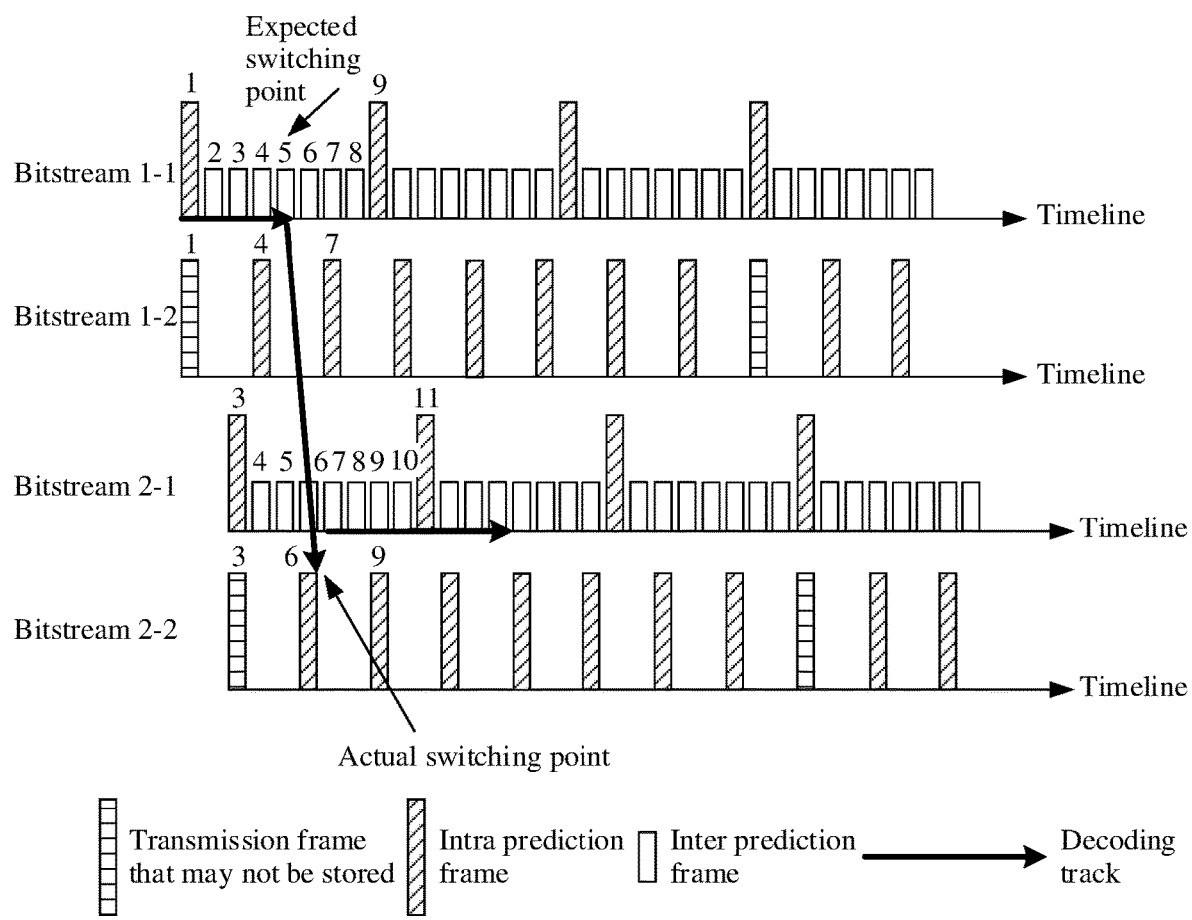

For example, FIG. 12 shows viewpoint bitstreams of two viewpoints in a multi-viewpoint shooting scenario. A first type bitstream (GOP stream) of a viewpoint bitstream 1 is recorded as a bitstream 1-1, a second type bitstream (a full intra prediction frame stream encoded at an interval of three frames) of the viewpoint bitstream 1 is recorded as a bitstream 1-2, a first type bitstream (GOP stream) of a viewpoint bitstream 2 is recorded as a bitstream 2-1, and a second type bitstream (full intra prediction frame stream encoded at an interval of three frames) of the viewpoint bitstream 2 is recorded as a bitstream 2-2. $i^{th}$ random access frames in the first type bitstreams of the two viewpoint bitstreams are at an interval of two frames.

In the multiple viewpoint bitstreams shown in FIG. 12, it is assumed that the decoding device receives a switching request input by a user when an image frame with PTS=5 in the bitstream 1-1 is played. The switching request indicates to play the bitstream of the viewpoint 2, and the image frame with PTS=5 in the bitstream 1-1 is a first image frame. The decoding device determines, between a next random access frame (the image frame with PTS=11) that is in the bitstream 2-1 and whose play moment is after the first image frame and a next random access frame (the image frame with PTS=6) that is in the bitstream 2-2 and whose play moment is after the first image frame, a random access frame (the image frame with PTS=6 in the bitstream 2-2) whose play moment is closest to the first image frame as the first random access frame, and the second random access frame is the image frame with PTS=9 in the bitstream 1-1.

Specifically, in the multiple viewpoint bitstreams shown in FIG. 12, an inter prediction of an inter prediction coding frame that is in the first type bitstream (the bitstream 2-1) of the viewpoint bitstream 2 and whose play moment is after the image frame with PTS=6 refers only to the image frame with PTS=6 in the bitstream 2-2, and an image frame that is in the bitstream 2-1 and whose play moment is after the play moment of the image frame with PTS-6. The inter prediction of the inter prediction coding frame that is in the first type bitstream (the bitstream 2-1) of the viewpoint bitstream 2 and whose play moment is after the image frame with PTS=6 does not refer to an image frame that is in the bitstream 2-1 and whose play moment is before the play moment of the image frame with PTS=6. The inter prediction of the inter prediction coding frame that is in the first type bitstream (the bitstream 2-1) of the viewpoint bitstream 2 and whose play moment is after the image frame with PTS=6 does not refer to an image frame that is in the bitstream 2-2 and whose play moment is after the play moment of the image frame with PTS=6.

S705: The decoding device decodes to obtain the first random access frame based on encoded data of the first random access frame in the second viewpoint bitstream, and decodes to obtain and play an image frame that is in the first type bitstream of the second viewpoint bitstream and whose play moment is after the first random access frame by using the first random access frame as a reference frame.

Specifically, because the play moment of the first random access frame may be the same as or different from the play moment of the first image frame, the process of performing S705 by the decoding device may include the following several cases.

Case 1: The play moment of the first random access frame is different from the play moment of the first image frame.

In the case 1, the decoding device may decode and play the first type bitstream of the first viewpoint bitstream till a second image frame, perform S705 and decode to obtain the first random access frame based on the encoded data of the first random access frame in the second viewpoint bitstream, decode to obtain and play an image frame that is in the first type bitstream of the second viewpoint bitstream and whose play moment is after the first random access frame by using the first random access frame as a reference frame, and play the first random access frame after playing the second image frame.

The second image frame is a previous image frame of an image frame whose play moment is the same as the play moment of the first random access frame in the first type bitstream of the first viewpoint bitstream.

Case 2: The play moment of the first random access frame is the same as the play moment of the first image frame.

In the case 2, the decoding device may decode and play the first type bitstream of the first viewpoint bitstream till the first image frame, perform S705 and decode to obtain the first random access frame based on the encoded data of the first random access frame in the second viewpoint bitstream, and decode to obtain and play an image frame that is in the first type bitstream of the second viewpoint bitstream and whose play moment is after the first random access frame by using the first random access frame as a reference frame. The first random access frame is only decoded but not played when S705 is performed.

Further, in the viewpoint bitstreams shown in FIG. 12, it is assumed that the decoding device receives a switching request input by a user when the image frame with PTS=5 in the bitstream 1-1 is played. The switching request indicates to play the bitstream of the viewpoint 2, and a processing process of the decoding device may be as follows;

The decoding device determines the image frame with PTS=6 in the bitstream 2-2 as the first random access frame, the decoding device plays the image frame with PTS=5 in the bitstream 1-1, decodes to obtain and play the image frame with PTS=6 in the bitstream 2-2 based on the encoded data of the image frame with PTS=6 in the bitstream 2-2, and decodes to obtain and play the image frame with PTS=7 in the bitstream 2-1 and later image frames by using the image frame with PTS=6 in the bitstream 2-2 as a reference frame. An arrow in FIG. 12 indicates a decoding track.

According to the decoding method provided in the present disclosure, the first type bitstream of the second viewpoint bitstream is configured to include a random access frame whose play moment is between play moments of two adjacent random access frames of the first type bitstream of the first viewpoint bitstream, and/or the second type bitstream of the second viewpoint bitstream is configured to include a random access frame whose play moment is between the play moments of the two adjacent random access frames of the first type bitstream of the first viewpoint bitstream. When the first viewpoint bitstream is switched to the second viewpoint bitstream, the switching can be performed before playing of a random access segment of the first viewpoint bitstream is completed. This reduces an interval between a switching point expected by the user and a random access frame (access point) of a target viewpoint, reduces a switching delay, implements viewpoint switching with a low switching delay in a multi-viewpoint shooting scenario, and improves user experience.

It should be noted that an execution sequence of steps included in the encoding and decoding method provided in embodiments of the present disclosure may be configured based on an actual requirement. The accompanying drawings for embodiments of the present disclosure merely show a possible execution sequence, and do not constitute a limitation.

The following describes the solutions provided in embodiments of the present disclosure by using specific examples.

Embodiment 1

Figure 13:
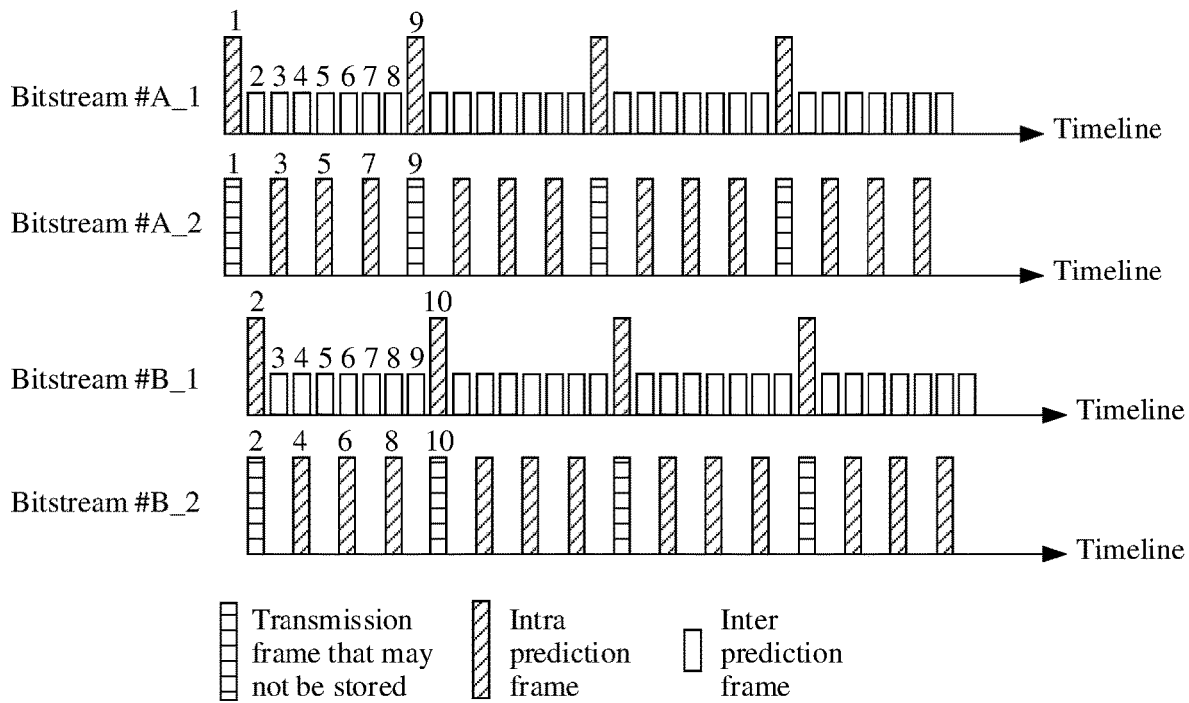

In a multi-viewpoint shooting scenario, it is assumed that two viewpoints (a viewpoint A and a viewpoint B) are deployed. A viewpoint bitstream of each viewpoint includes a GOP stream (with a random access frame being an intra prediction frame) and a full intra prediction frame stream. In a preset viewpoint order, intra prediction frames of GOP streams of adjacent viewpoints are at an interval of one frame, and encoding to obtain an intra prediction frame is performed at an interval of two frames in the full intra prediction frame stream. FIG. 13 shows the viewpoint bitstreams of the viewpoint A and the viewpoint B. The GOP stream in the viewpoint bitstream of the viewpoint A is recorded as a bitstream #A_1, the full intra prediction frame stream in the viewpoint bitstream of the viewpoint A is recorded as a bitstream #A_2, the GOP stream in the viewpoint bitstream of the viewpoint B is recorded as a bitstream #B_1, and the full intra prediction frame stream in the viewpoint bitstream of the viewpoint B is recorded as a bitstream #B_2.

In one case, a switching point expected by a user is at a location of an intra prediction frame of the GOP stream of a new viewpoint.

Figure 14:
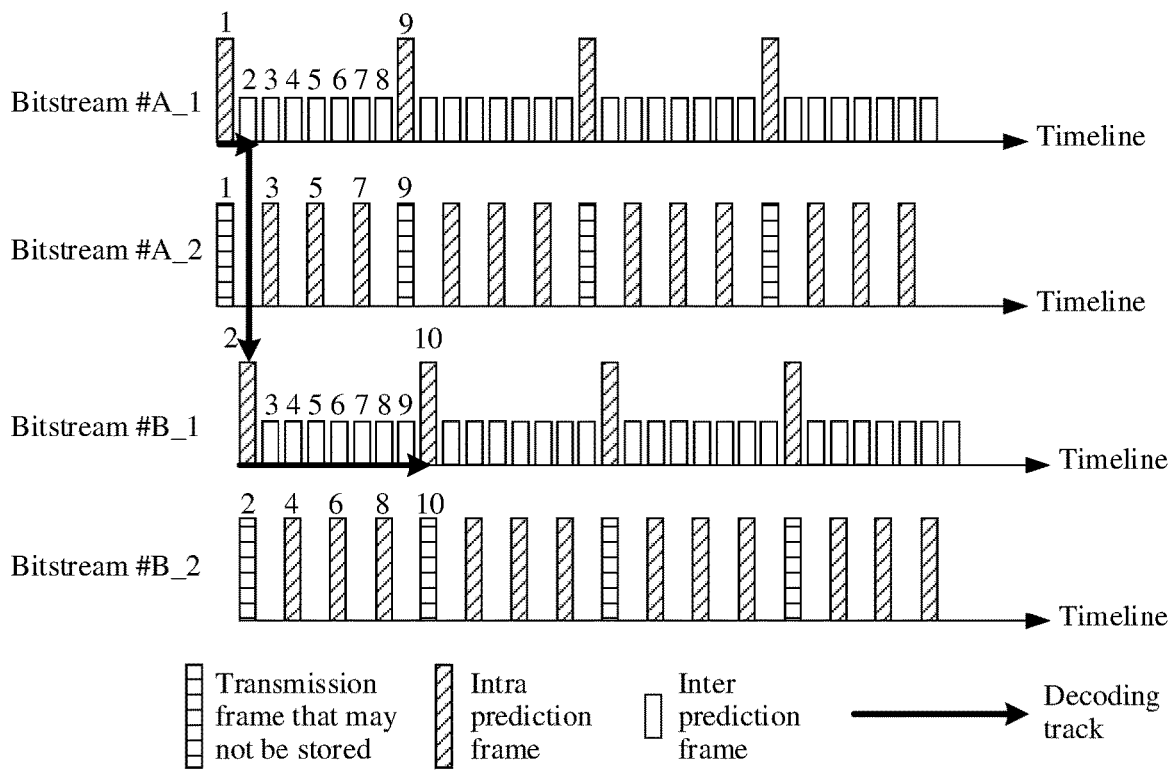

In the scenario shown in FIG. 13, as shown in FIG. 14, when the user watches till an image frame with PTS=2 of the viewpoint A, the user inputs a switching instruction, indicating to play the viewpoint bitstream of the viewpoint B. After receiving the switching instruction, a decoding device determines that a first random access frame is an intra prediction frame with PTS=2 in the bitstream #B_1. The decoding device plays the image frame with PTS=2 of the viewpoint A, and the decoding device decodes to obtain the intra prediction frame with PTS=2 in the bitstream #B_1, and decodes to obtain and play an image frame with PTS=3 in the bitstream #B_1 and later image frames by using the intra prediction frame with PTS=2 in the bitstream #B_1 as a reference frame. An arrow in FIG. 14 indicates a decoding track.

In another case, a switching point expected by a user is at a location other than an intra prediction frame of the GOP stream of a new viewpoint.

Figure 15:
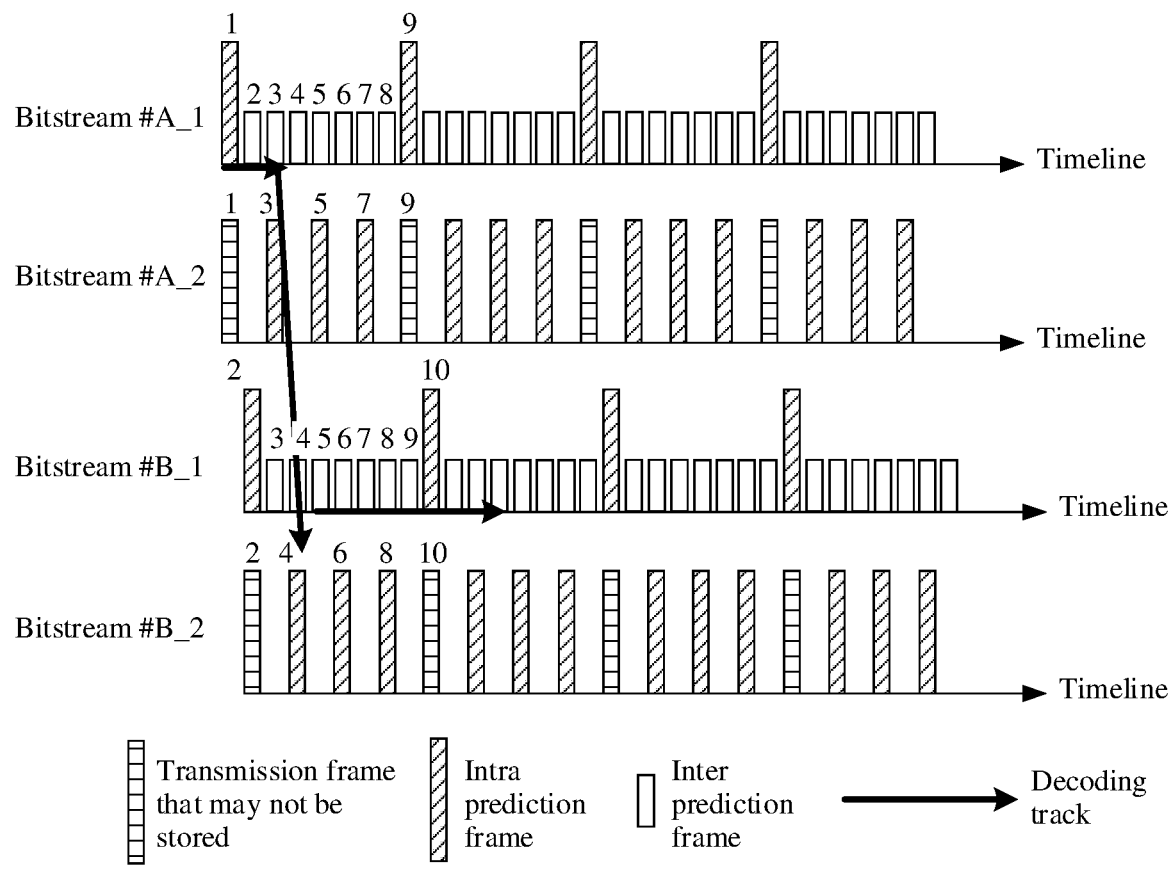

In the scenario shown in FIG. 13, as shown in FIG. 15, when the user watches till an image frame with PTS=3 of the viewpoint A, the user inputs a switching instruction, indicating to play the viewpoint bitstream of the viewpoint B. After receiving the switching instruction, a decoding device determines that a first random access frame is an intra prediction frame with PTS=4 in the bitstream #B_2. The decoding device plays the image frame with PTS=3 of the viewpoint A, and the decoding device decodes to obtain and play the intra prediction frame with PTS=4 in the bitstream #B_2, and decodes to obtain and play an image frame with PTS=5 in the bitstream #B_1 and later image frames by using the intra prediction frame with PTS=4 in the bitstream #B_2 as a reference frame. An arrow in FIG. 15 indicates a decoding track.

In this embodiment, an encoding device prepares two types of bitstreams for each viewpoint, where one is a GOP bitstream, and the other is a full intra prediction frame stream whose frame rate is reduced by half, so that switching between images of multiple viewpoints can be completed within a single frame delay, saving storage space. The encoding calculation amount and storage amount can be reduced by half by using the full intra prediction frame stream, and switching can be implemented by transmitting only one frame of full intra prediction frame, saving a large amount of bandwidth. In addition, a quantity of bitstreams is small, reducing the encoding calculation amount and storage cost.

Embodiment 2

Figure 16:
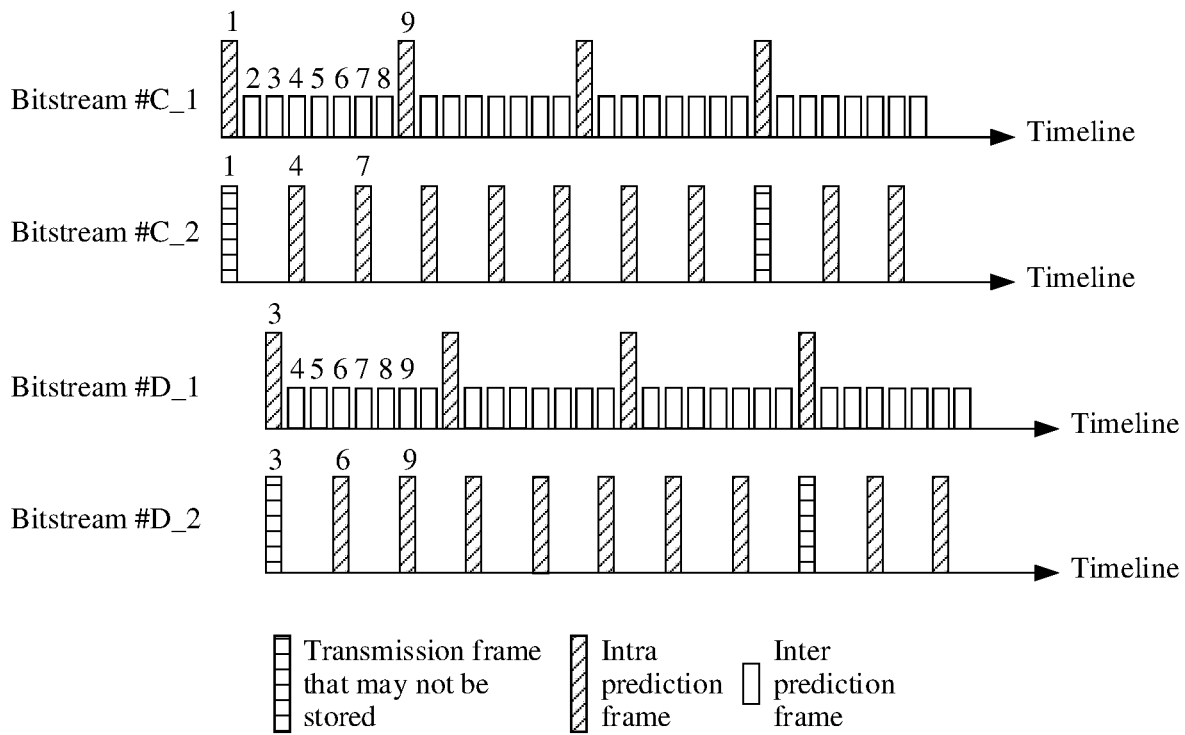

In a multi-viewpoint shooting scenario, it is assumed that two viewpoints (a viewpoint C and a viewpoint D) are deployed. A viewpoint bitstream of each viewpoint includes a GOP stream (with a random access frame being an intra prediction frame) and a full intra prediction frame stream. In a preset viewpoint order, intra prediction frames of GOP streams of adjacent viewpoints are alternately at an interval of two frames, and encoding to obtain an intra prediction frame is performed at an interval of three frames in the full intra prediction frame stream. FIG. 16 shows the viewpoint bitstreams of the viewpoint C and the viewpoint D. The GOP stream in the viewpoint bitstream of the viewpoint C is recorded as a bitstream #C_1, the full intra prediction frame stream in the viewpoint bitstream of the viewpoint C is recorded as a bitstream #C_2, the GOP stream in the viewpoint bitstream of the viewpoint D is recorded as a bitstream #D_1, and the full intra prediction frame stream in the viewpoint bitstream of the viewpoint D is recorded as a bitstream #D_2.

In one case, a switching point expected by a user is at a location of an intra prediction frame of the GOP stream of a new viewpoint.

Figure 17:
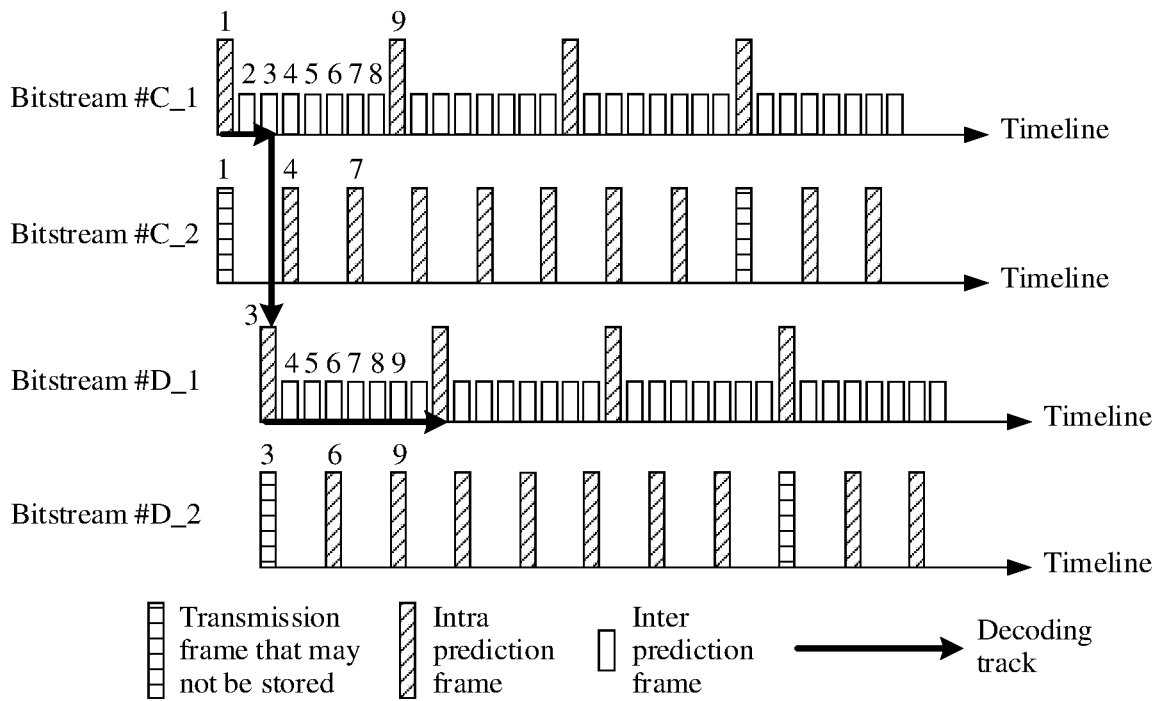

In the scenario shown in FIG. 16, as shown in FIG. 17, when the user watches till an image frame with PTS=3 of the viewpoint C, the user inputs a switching instruction, indicating to play the viewpoint bitstream of the viewpoint D. After receiving the switching instruction, a decoding device determines that a first random access frame is an intra prediction frame with PTS=3 in the bitstream #D_1. The decoding device plays the image frame with PTS=3 of the viewpoint C, and the decoding device decodes to obtain the intra prediction frame with PTS=3 in the bitstream #D_1, and decodes to obtain and play an image frame with PTS=4 in the bitstream #D_1 and later image frames by using the intra prediction frame with PTS=3 in the bitstream #D_1 as a reference frame. An arrow in FIG. 17 indicates a decoding track.

In another case, a switching point expected by a user is at a location other than an intra prediction frame of the GOP stream of a new viewpoint.

Figure 18:
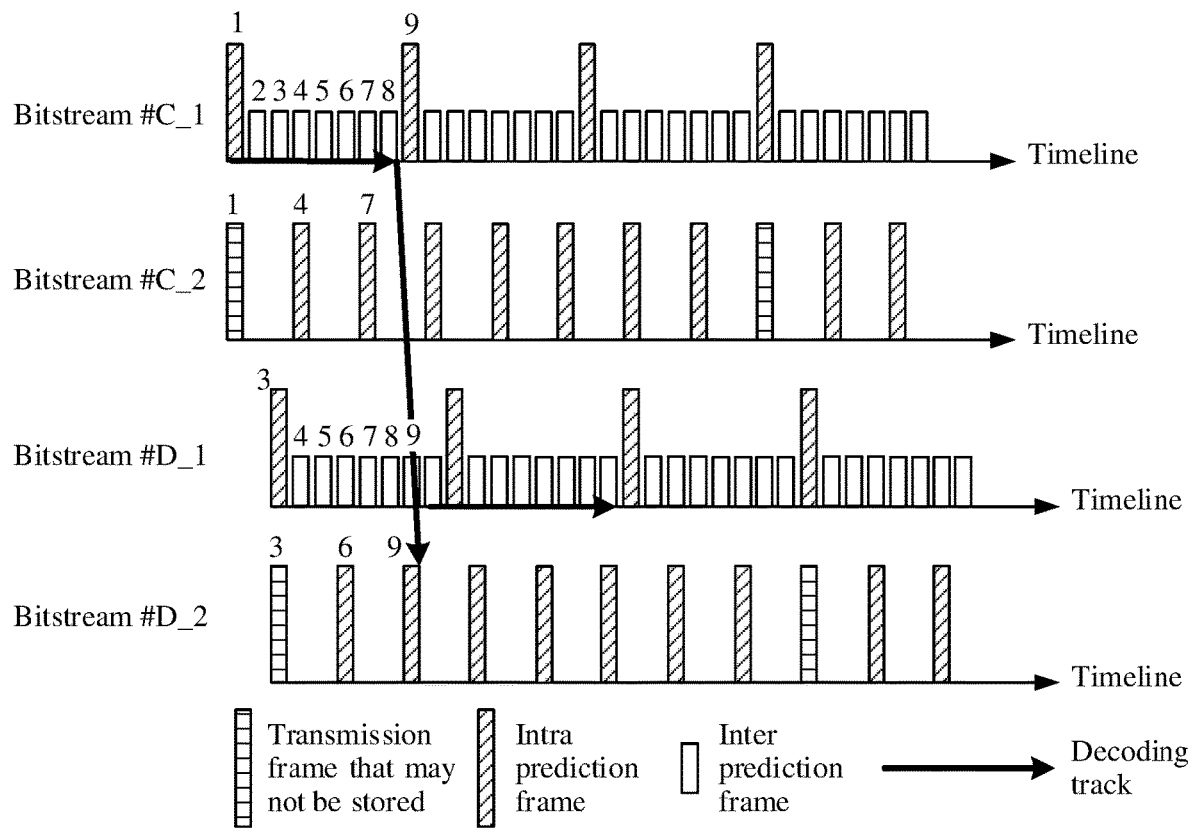

In the scenario shown in FIG. 16, as shown in FIG. 18, when the user watches till an image frame with PTS=6 of the viewpoint C, the user inputs a switching instruction, indicating to play the viewpoint bitstream of the viewpoint D. After receiving the switching instruction, a decoding device determines that a first random access frame is an intra prediction frame with PTS=9 in the bitstream #D_2. The decoding device decodes to obtain and play the image frame with PTS=8 of the viewpoint C, and the decoding device decodes to obtain and play the intra prediction frame with PTS=9 in the bitstream #D_2, and decodes to obtain and play an image frame with PTS=10 in the bitstream #D_1 and later image frames by using the intra prediction frame with PTS=9 in the bitstream #D_2 as a reference frame. There is a delay of two frames for switching from the viewpoint C to the viewpoint D. An arrow in FIG. 18 indicates a decoding track.

In this embodiment, two types of bitstreams are prepared for each viewpoint, where one is a GOP bitstream, and the other is a full intra prediction frame stream whose frame rate is reduced to ⅓ of an original frame rate. Switching between images of multiple viewpoints can be completed with a maximum delay of two frames, saving storage space and applying to scenarios requiring lower delays. The encoding calculation amount and storage amount can be reduced by two thirds by using the full intra prediction frame stream, and switching can be implemented by transmitting only one frame of full intra prediction frame, saving a large amount of bandwidth. A quantity of bitstreams is small, reducing the encoding calculation amount and storage cost.

It should be noted that, in the foregoing embodiments of the present disclosure, an example in which the PTS of the bitstream is consistent with the DTS is used for description, and this is not specifically limited. In actual application, decoding may be performed according to a DTS order, and display may be performed according to a PTS order.

It should be further noted that in this embodiment, an example in which one viewpoint bitstream includes only one bitstream group is used for specific description, and this does not constitute a specific limitation.

The foregoing mainly describes the solutions provided in embodiments of the present disclosure from perspectives of working principles of the encoding device and the decoding device. It may be understood that to implement the foregoing functions, the encoding device and the decoding device include hardware structures and/or software modules corresponding to the functions. A person skilled in the art should be easily aware that, in combination with units and algorithm steps of the examples described in embodiments disclosed in this specification, the present disclosure can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In this embodiment, the devices that implement the encoding and decoding method may be divided into functional modules based on the foregoing method examples. For example, functional modules may be obtained through division based on corresponding functions, or two or more functions may be integrated into one processing module. The integrated module may be implemented in a form of hardware, or may be implemented in a form of a software functional module. It should be noted that, in embodiments of the present disclosure, division into the modules is an example and is merely logical function division, and may be other division in an actual implementation.

Figure 19:
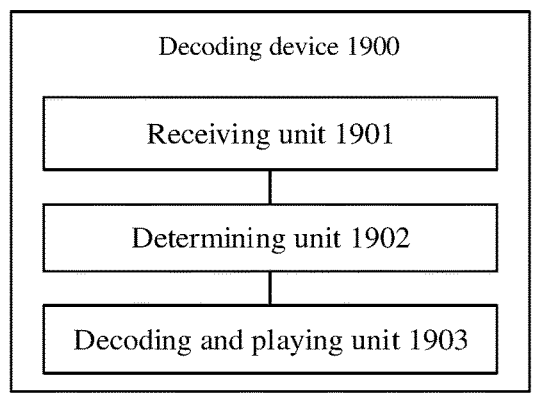
FIG. 19 is a schematic diagram depicting a structure of a decoding device according to an embodiment of the present disclosure.

When functional modules are divided corresponding to functions, FIG. 19 shows a schematic diagram depicting a possible structure of a decoding device 1900 in the foregoing embodiments. The decoding device 1900 may be a functional module or a chip. As shown in FIG. 19, the decoding device 1900 may include a receiving unit 1901, a determining unit 1902, and a decoding and playing unit 1903. The receiving unit 1901 is configured to perform the process S703 in FIG. 7. The determining unit 1902 is configured to perform the process S704 in FIG. 7. The decoding and playing unit 1903 is configured to perform the process S705 in FIG. 7. All related content of the steps in the foregoing method embodiments may be cited in function descriptions of the corresponding functional modules. Details are not described herein again.

The receiving unit 1901 may be a hardware unit. The decoding and playing unit 1903 may implement a decoding process through software decoding, hardware decoding, or software and hardware hybrid decoding. When the decoding and playing unit 1903 uses software decoding, the decoding and playing unit 1903 may invoke code to implement the decoding process. The decoding and playing unit 1903 may be a GPU, a CP, a DSP, an AI chip, or another type. When the decoding and playing unit 1903 uses hardware decoding, the decoding and playing unit 1903 may be an ASIC, an FPGA, or another hardware unit. When the decoding and playing unit 1903 uses software and hardware hybrid decoding, the decoding and playing unit 1903 may include some units of software decoding and some units of hardware decoding.

Figure 20:
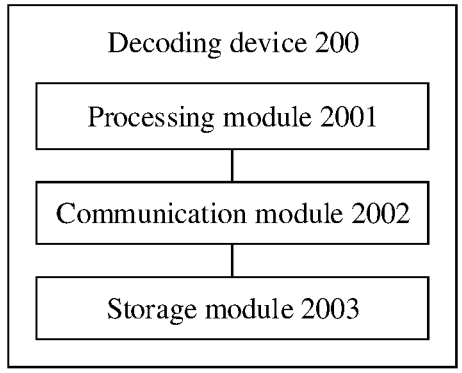
FIG. 20 is a schematic diagram depicting a structure of another decoding device according to an embodiment of the present disclosure.

When an integrated unit is used, FIG. 20 shows a schematic diagram depicting a possible structure of a decoding device in the foregoing embodiments. As shown in FIG. 20, the decoding device 200 may include a processing module 2001 and a communication module 2002. The processing module 2001 is configured to control and manage an action of the decoding device 200, and the communication module 2002 is configured to communicate with another device. For example, the processing module 2001 performs the process S701 in FIG. 7 by using the communication module 2002, and the processing module 2001 is configured to perform any one of the processes S704 to S705 in FIG. 7. The decoding device 200 may further include a storage module 2003, configured to store program code and data of the decoding device 200.

The processing module 2001 may be the processor 501 in the physical structure of the image processing device 50 shown in FIG. 5, and may be a processor or a controller. For example, the processing module may be a CPU, a general-purpose processor, a DSP, an ASIC, an FPGA or another programmable logic device, a transistor logic device, a hardware component, or any combination thereof. The processing module may implement or execute logical blocks, modules, and circuits in various examples described with reference to content disclosed in the present disclosure. The processing module 2001 may alternatively be a combination implementing a computing function, for example, a combination of one or more microprocessors, or a combination of a DSP and a microprocessor. The communication module 2002 may be the transceiver 503 in the physical structure of the image processing device 50 shown in FIG. 5. The communication module 2002 may be a communication port, or may be a transceiver, a transceiver circuit, a communication interface, or the like. Alternatively, the communication interface may communicate with another device by using the foregoing element that has receiving and sending functions. The foregoing element that has receiving and sending functions may be implemented by using an antenna and/or a radio frequency apparatus. The storage module 2003 may be the memory 502 in the physical structure of the image processing device 50 shown in FIG. 5.

When the processing module 2001 is a processor, the communication module 2002 is a transceiver, and the storage module 2003 is a memory, the decoding device 200 in FIG. 20 in this embodiment may be the image processing device 50 shown in FIG. 5.

As described above, the decoding device 1900 or the decoding device 200 provided in this embodiment may be configured to implement corresponding functions of the decoding device in the methods implemented in the foregoing embodiments of the present disclosure. For ease of description, only a part related to this embodiment is shown. For specific technical details that are not disclosed, refer to embodiments of the present disclosure.

Figure 21:
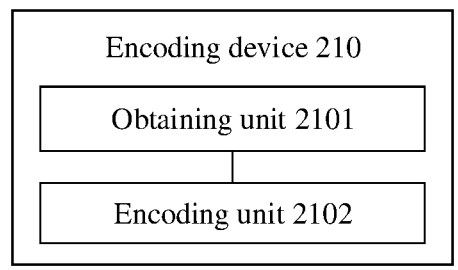
FIG. 21 is a schematic diagram depicting a structure of an encoding device according to an embodiment of the present disclosure.

When functional modules are divided corresponding to functions, FIG. 21 shows a schematic diagram depicting a possible structure of an encoding device 210 in the foregoing embodiments. The encoding device 210 may be a functional module or a chip. As shown in FIG. 21, the encoding device 210 may include an obtaining unit 2101 and an encoding unit 2102. The obtaining unit 2101 is configured to perform the process S701 in FIG. 7. The encoding unit 2102 is configured to perform the process S702 in FIG. 7. All related content of the steps in the foregoing method embodiments may be cited in function descriptions of the corresponding functional modules. Details are not described herein again.

Figure 22:
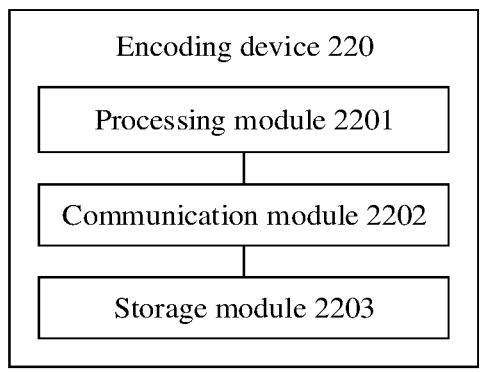
FIG. 22 is a schematic diagram depicting a structure of another encoding device according to an embodiment of the present disclosure.

When an integrated unit is used, FIG. 22 shows a schematic diagram depicting a possible structure of an encoding device in the foregoing embodiments. As shown in FIG. 22, the encoding device 220 may include a processing module 2201 and a communication module 2202. The processing module 2201 is configured to control and manage an action of the encoding device 220, and the communication module 2202 is configured to communicate with another device. For example, the processing module 2201 is configured to perform the process S701 or S702 in FIG. 7. The encoding device 220 may further include a storage module 2203, configured to store program code and data of the encoding device 220.

The processing module 2201 may be the processor 501 in the physical structure of the image processing device 50 shown in FIG. 5, and may be a processor or a controller. For example, the processing module may be a CPU, a general-purpose processor, a DSP, an ASIC, an FPGA or another programmable logic device, a transistor logic device, a hardware component, or any combination thereof. The processing module may implement or execute logical blocks, modules, and circuits in various examples described with reference to content disclosed in the present disclosure. The processing module 2201 may alternatively be a combination implementing a computing function, for example, a combination of one or more microprocessors, or a combination of a DSP and a microprocessor. The communication module 2202 may be the transceiver 503 in the physical structure of the image processing device 50 shown in FIG. 5. The communication module 2202 may be a communication port, or may be a transceiver, a transceiver circuit, a communication interface, or the like. Alternatively, the communication interface may communicate with another device by using the foregoing element that has receiving and sending functions. The foregoing element that has receiving and sending functions may be implemented by using an antenna and/or a radio frequency apparatus. The storage module 2203 may be the memory 502 in the physical structure of the image processing device 50 shown in FIG. 5.

When the processing module 2201 is a processor, the communication module 2202 is a transceiver, and the storage module 2203 is a memory, the encoding device 220 in FIG. 22 in this embodiment may be the image processing device 50 shown in FIG. 5.

As described above, the encoding device 210 or the encoding device 220 provided in this embodiment may be configured to implement corresponding functions in the methods implemented in the foregoing embodiments of the present disclosure. For ease of description, only a part related to this embodiment is shown. For specific technical details that are not disclosed, refer to embodiments of the present disclosure.

In another form of this embodiment, a computer-readable storage medium is provided, including multiple viewpoint bitstreams obtained by shooting a same scene at multiple viewpoints, where each of the multiple viewpoint bitstreams includes a first type bitstream and a second type bitstream. A first type bitstream of any viewpoint bitstream in the multiple viewpoint bitstreams and/or a second type bitstream of the viewpoint bitstream include/includes a random access frame serving as a reference frame for decoding the first type bitstream of the viewpoint bitstream, and the first type bitstream of the viewpoint bitstream includes a random access frame whose play moment is between play moments of two adjacent random access frames of the first type bitstream of another viewpoint bitstream, and/or the second type bitstream of the viewpoint bitstream includes a random access frame whose play moment is between the play moments of the two adjacent random access frames of the first type bitstream of the another viewpoint bitstream.

In another form of this embodiment, a computer-readable storage medium is provided. The computer-readable storage medium stores instructions. When the instructions are executed, the encoding and decoding method in the foregoing method embodiments are performed.

In another form of this embodiment, a computer program product including instructions is provided. When the computer program product runs on a computer, the computer is enabled to perform the encoding and decoding method in the foregoing method embodiments.

An embodiment of the present disclosure further provides a chip system. The chip system includes a processor, configured to implement the technical method according to embodiments of the present invention. In a possible design, the chip system further includes a memory, configured to store program instructions and/or data that are/is necessary for embodiments of the present invention. In a possible design, the chip system further includes a memory, configured to enable the processor to invoke application program code stored in the memory. The chip system may include one or more chips, or may include a chip and another discrete component. This is not specifically limited in this embodiment.

Method or algorithm steps described in combination with the content disclosed in the present disclosure may be implemented by hardware, or may be implemented by a processor by executing software instructions. The software instruction may include a corresponding software module. The software module may be stored in a RAM, a flash memory, a ROM, an erasable programmable read-only memory (EPROM), an electrically erasable programmable read-only memory (electrically EPROM, EEPROM), a register, a hard disk, a removable hard disk, a compact disc read-only memory (CD-ROM), or a storage medium in any other forms well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a core network interface device. Certainly, the processor and the storage medium may exist in the core network interface device as discrete components. Alternatively, the memory may be coupled to the processor. For example, the memory may exist independently, and is connected to the processor through a bus. The memory may alternatively be integrated with the processor. The memory may be configured to store application program code for executing the technical solutions provided in embodiments of the present disclosure, and the processor controls the execution. The processor is configured to execute the application program code stored in the memory, to implement the technical solutions provided in embodiments of the present disclosure.

Based on the foregoing descriptions of the implementations, persons skilled in the art may clearly understand that for the purpose of convenient and brief descriptions, division into the foregoing functional modules is merely used as an example for descriptions. During actual application, the foregoing functions can be allocated to different functional modules for implementation based on a requirement, in other words, an inner structure of an apparatus is divided into different functional modules to implement all or a part of the functions described above.

In the several embodiments provided in the present disclosure, it should be understood that the disclosed apparatuses and methods may be implemented in other manners. For example, the described apparatus embodiments are merely examples. For example, the division into modules or units is merely logical function division and may be other division during actual implementation. For example, a plurality of units or components may be combined or integrated into another apparatus, or some features may be ignored or not performed. In addition, the displayed or discussed mutual coupling or direct coupling or communication connection may be implemented through some interfaces. The indirect coupling or communication connection between the apparatuses or units may be implemented in electrical, mechanical, or other forms.

The units described as separate parts may or may not be physically separate, and parts displayed as units may be one or more physical units, may be located in one place, or may be distributed in different places. Some or all of the units may be selected based on actual requirements to achieve the objectives of the solutions of the embodiments.

In addition, functional units in embodiments of the present disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of the present disclosure essentially, or the part contributing to a conventional technology, or all or a part of the technical solutions may be implemented in the form of a software product. The software product is stored in a storage medium and includes several instructions for indicating a device (which may be a single-chip microcomputer, a chip or the like) or a processor to perform all or a part of the steps of the methods described in embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement within the technical scope disclosed in the present disclosure shall fall within the protection scope of the present disclosure. Therefore, the protection scope of the present disclosure shall be subject to the protection scope of the claims.

What is claimed is:

1. A decoding method, applied to a decoding device configured to decode multiple viewpoint bitstreams obtained by shooting a same scene at multiple viewpoints, wherein viewpoint bitstreams of each of the multiple viewpoints comprise a first type bitstream and a second type bitstream; a first type bitstream of any viewpoint bitstream in the multiple viewpoint bitstreams and/or a second type bitstream of the viewpoint bitstream comprise/comprises a random access frame serving as a reference frame for decoding the first type bitstream of the viewpoint bitstream, and the method comprises:

receiving a switching request when a first image frame in a first type bitstream of a first viewpoint bitstream in the multiple viewpoint bitstreams is played, wherein the switching request indicates the decoding device to play a second viewpoint bitstream in the multiple viewpoint bitstreams;

determining a first random access frame that is in a first type bitstream and/or a second type bitstream of the second viewpoint bitstream and has a play moment after the first image frame and closest to the first image frame, wherein the first type bitstream of the second viewpoint bitstream comprises a random access frame with a play moment between play moments of two adjacent random access frames of the first type bitstream of the first viewpoint bitstream, and/or the second type bitstream of the second viewpoint bitstream comprises a random access frame with a play moment between the play moments of the two adjacent random access frames, and a play moment of the first image frame is between the play moments of the two adjacent random access frames; and decoding to obtain the first random access frame based on encoded data of the first random access frame in the second viewpoint bitstream, and decoding to obtain and play an image frame that is in the first type bitstream of the second viewpoint bitstream and has a play moment after the first random access frame by using the first random access frame as a reference frame, wherein the first type bitstream comprises intra prediction frames distributed at intervals, two adjacent intra prediction frames are at an interval of one or more inter prediction frames, and all images frames in the second type bitstream are intra prediction frames.

2. The method according to claim 1, wherein play moments corresponding to random access frames in the first type bitstream of the first viewpoint bitstream are all different from play moments corresponding to random access frames in the first type bitstream of the second viewpoint bitstream; or play moments corresponding to random access frames in the first type bitstream of the first viewpoint bitstream are all different from play moments corresponding to random access frames in the second type bitstream of the second viewpoint bitstream.

3. The method according to claim 2, wherein the play moments corresponding to the random access frames in the first type bitstream of the second viewpoint bitstream are all different from the play moments corresponding to the random access frames in the second type bitstream of the second viewpoint bitstream.

4. The method according to claim 1, wherein a play moment corresponding to the first random access frame is before a play moment corresponding to a second random access frame, and the second random access frame is in the first type bitstream of the first viewpoint bitstream and is after the first image frame and closest to the first image frame.

5. The method according to claim 1, wherein the second type bitstream of the viewpoint bitstream comprises any random access frame, the random access frame is an intra prediction frame, and an inter prediction of an inter prediction frame that is in the first type bitstream of the viewpoint bitstream and has a play moment after the play moment of the random access frame refers only to at least one of the random access frame, an image frame that is in the first type bitstream of the viewpoint bitstream and has a play moment at the play moment of the random access frame, or an image frame that is in the first type bitstream of the viewpoint bitstream and has a play moment after the play moment of the random access frame.

6. The method according to claim 5, wherein the viewpoint bitstream is the second viewpoint bitstream, and the random access frame is the first random access frame.

7. The method according to claim 1, wherein the multiple viewpoints are at least two viewpoints, the multiple viewpoint bitstreams are at least two viewpoint bitstreams, and a quantity of the multiple viewpoints is the same as that of the multiple viewpoint bitstreams.

8. The method according to claim 1, wherein the random access frame of the second type bitstream of the viewpoint bitstream is used to: when an image frame serving as a reference frame in the first type bitstream of the viewpoint bitstream is unavailable, replace a unavailable reference frame in the first type bitstream of the viewpoint bitstream; and serve as a reference frame of an image frame that refers to the unavailable reference frame in the first type bitstream of the viewpoint bitstream.

9. The method according to claim 1, wherein the first type bitstream and the second type bitstream of the second viewpoint bitstream are obtained by encoding a same video frame sequence, the second type bitstream is obtained by encoding a subsequence of the same video frame sequence, adjacent image frames in the subsequence are at an interval of M frames in the same video sequence, and M is greater than or equal to 1.

10. The method according to claim 1, wherein the determining a first random access frame that is in a first type bitstream and/or a second type bitstream of the second viewpoint bitstream and has a play moment after the first image frame and closest to the first image frame comprises:
determining, from a next random access frame that is in the first type bitstream of the second viewpoint bitstream and has a play moment after the first image frame and a next random access frame that is in the second type bitstream of the second viewpoint bitstream and has a play moment after the first image frame, a random access frame with a play moment closest to the first image frame as the first random access frame.

11. The method according to claim 1, wherein a type of an image frame in the second type bitstream is an I-frame, a P-frame, or a B-frame of which coding block prediction modes are all intra prediction.

12. An encoding method, applied to an encoding device configured to encode multiple video frame sequences obtained by shooting a same scene at multiple viewpoints, wherein the method comprises:
obtaining the multiple video frame sequences; and
encoding the multiple video frame sequences to obtain multiple viewpoint bitstreams, wherein a quantity of the multiple video frame sequences is the same as that of the multiple viewpoint bitstreams, wherein
viewpoint bitstreams of each of the multiple viewpoints comprise a first type bitstream and a second type bitstream; and a first type bitstream of any viewpoint bitstream in the multiple viewpoint bitstreams and/or a second type bitstream of the viewpoint bitstream comprise/comprises a random access frame serving as a reference frame for decoding the first type bitstream of the viewpoint bitstream; the first type bitstream of the viewpoint bitstream comprises a random access frame with a play moment between play moments of two adjacent random access frames of the first type bitstream of another viewpoint bitstream in the multiple viewpoint bitstreams, and/or the second type bitstream of the viewpoint bitstream comprises a random access frame with a play moment between the play moments of the two adjacent random access frames,
wherein the first type bitstream comprises intra prediction frames distributed at intervals, two adjacent intra prediction frames are at an interval of one or more inter prediction frames, and all image frames in the second type bitstream are intra prediction frames.

13. The method according to claim 12, wherein play moments corresponding to random access frames in the first type bitstream of the viewpoint bitstream are all different from play moments corresponding to random access frames in the first type bitstream of the another viewpoint bitstream; or play moments corresponding to random access frames in the first type bitstream of the viewpoint bitstream are all different from play moments corresponding to random access frames in the second type bitstream of the another viewpoint bitstream.

14. The method according to claim 13, wherein the play moments corresponding to the random access frames in the first type bitstream of the viewpoint bitstream are all different from the play moments corresponding to the random access frames in the second type bitstream of the viewpoint bitstream.

15. The method according to claim 12, wherein the second type bitstream of the viewpoint bitstream comprises any random access frame, the random access frame is an intra prediction frame, and an inter prediction of an inter prediction frame that is in the first type bitstream of the viewpoint bitstream and has a play moment after the play moment of the random access frame refers only to at least one of the random access frame, an image frame that is in the first type bitstream of the viewpoint bitstream and has a play moment at the play moment of the random access frame, or an image frame that is in the first type bitstream of the viewpoint bitstream and has a play moment after the play moment of the random access frame.

16. The method according to claim 12, wherein the first type bitstream and the second type bitstream of the viewpoint bitstream are obtained by encoding a same video frame sequence, the second type bitstream is obtained by encoding a subsequence of the same video frame sequence, adjacent image frames in the subsequence are at an interval of M frames in the same video sequence, and M is greater than or equal to 1.

17. A non-transitory, computer-readable storage medium, comprising multiple viewpoint bitstreams obtained by shooting a same scene at multiple viewpoints, and viewpoint bitstreams of each of the multiple viewpoints comprise a first type bitstream and a second type bitstream; a first type bitstream of any viewpoint bitstream in the multiple viewpoint bitstreams and/or a second type bitstream of the viewpoint bitstream comprise/comprises a random access frame serving as a reference frame for decoding the first type bitstream of the viewpoint bitstream; and the first type bitstream of the viewpoint bitstream comprises a random access frame with a play moment between play moments of two adjacent random access frames of the first type bitstream of another viewpoint bitstream in the multiple viewpoint bitstreams, and/or the second type bitstream of the viewpoint bitstream comprises a random access frame with a play moment between the play moments of the two adjacent random access frames of the first type bitstream in the another viewpoint bitstream, wherein the first type bitstream comprises intra prediction frames distributed at intervals, two adjacent intra prediction frames are at an interval of one or more inter prediction frames, and all image frames in the second type bitstream are intra prediction frames.

18. The non-transitory, computer-readable storage medium according to claim 17, wherein play moments corresponding to random access frames in the first type bitstream of the viewpoint bitstream are all different from play moments corresponding to random access frames in the first type bitstream of the another viewpoint bitstream; or play moments corresponding to random access frames in the first type bitstream of the viewpoint bitstream are all different from play moments corresponding to random access frames in the second type bitstream of the another viewpoint bitstream.

19. The non-transitory, computer-readable storage medium according to claim 17, wherein the first type bitstream and the second type bitstream of the viewpoint bitstream are obtained by encoding a same video frame sequence, the second type bitstream is obtained by encoding a subsequence of the same video frame sequence, adjacent image frames in the subsequence are at an interval of M frames in the same video sequence, and M is greater than or equal to 1.

* * * * *

UNITED STATES PATENT AND TRADEMARK OFFICE
CERTIFICATE OF CORRECTION

PATENT NO. : 12,289,492 B2
APPLICATION NO. : 18/173887
DATED : April 29, 2025
INVENTOR(S) : Huameng Fang Page 1 of 2

It is certified that error appears in the above-identified patent and that said Letters Patent is hereby corrected as shown below:

In the Specification

Column 1, Line 7, change "This application continuation" to --This application is a continuation--;

Column 13, Line 25, change "X-I frames" to --X-1 frames--;

Column 14, Line 1, change "1 s, 2 s, or 5s" to --1s, 2s, or 5s--;

Column 16, Line 4, change "(RAM):" to --(RAM);--;

Column 16, Line 6, change "(SSD):" to --(SSD);--;

Column 17, Line 14, change "bitstream:" to --bitstream;--;

Column 17, Line 20, change "bitstream:" to --bitstream;--;

Column 26, Line 26, change "720 P" to --720P--;

Column 26, Line 26, change "720 P" to --720P--;

Column 26, Line 26, change "720 P" to --720P--;

Column 26, Line 27, change "1080 P" to --1080P--;

Column 26, Line 27, change "1080 P" to --1080P--;

Column 26, Line 27, change "1080 P" to --1080P--;

Column 32, Line 27, change "$703" to --S703--; and

Signed and Sealed this
Twenty-seventh Day of May, 2025

Coke Morgan Stewart
*Acting Director of the United States Patent and Trademark Office*

In the Claims

Column 44, Claim 1, Line 43, change "images frames" to --image frames--.